(12) United States Patent
Nozawa

(10) Patent No.: US 12,352,626 B2
(45) Date of Patent: Jul. 8, 2025

(54) RAMAN SPECTROSCOPY DEVICE AND RAMAN SPECTROSCOPY MEASUREMENT METHOD

(71) Applicant: Panasonic Intellectual Property Management Co., Ltd., Osaka (JP)

(72) Inventor: Katsuya Nozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 128 days.

(21) Appl. No.: 18/550,866

(22) PCT Filed: Mar. 23, 2022

(86) PCT No.: PCT/JP2022/013656
§ 371 (c)(1),
(2) Date: Sep. 15, 2023

(87) PCT Pub. No.: WO2022/210192
PCT Pub. Date: Oct. 6, 2022

(65) Prior Publication Data
US 2024/0219236 A1 Jul. 4, 2024

(30) Foreign Application Priority Data
Mar. 31, 2021 (JP) ................ 2021-060458

(51) Int. Cl.
*G01J 3/44* (2006.01)
*G01N 21/65* (2006.01)
(52) U.S. Cl.
CPC ............... *G01J 3/44* (2013.01); *G01N 21/65* (2013.01); *G01J 2003/4424* (2013.01)
(58) Field of Classification Search
CPC ........ G01J 3/44; G01J 3/26; G01J 2003/4424; G01N 21/65; G01N 21/64
See application file for complete search history.

(56) References Cited

U.S. PATENT DOCUMENTS 6,044,285 A * 3/2000 Chaiken ................ G01N 21/65
600/316
8,159,665 B2 4/2012 Wang et al.
(Continued)

FOREIGN PATENT DOCUMENTS

| JP | 2015-059800 A | 3/2015 |
|---|---|---|
| JP | 2017-207522 A | 11/2017 |
| JP | 2019-527366 A | 9/2019 |

OTHER PUBLICATIONS

International Search Report issued on Jun. 14, 2022 in International Patent Application No. PCT/JP2022/013656, with English translation.

(Continued)

*Primary Examiner* — Abdullahi Nur
(74) *Attorney, Agent, or Firm* — Rimon P.C.

(57) ABSTRACT

A Raman spectroscopy device includes: an irradiator that irradiates a sample with first excitation light having a first line width and second excitation light having a line width broader than the first line width; a spectroscopy measurer that, when first measurement light emitted from the sample when the sample is irradiated with the first excitation light and second measurement light emitted from the sample when the sample is irradiated with the second excitation light are incident, performs spectroscopy measurement on the first measurement light and the second measurement light; and a first selective optical system that has a first transmission band and a first stop band, and filters the first measurement light and the second measurement light incident on the spectroscopy measurer. The first excitation light and the second excitation light each have a main component in the first stop band, and the second excitation light has substantially no component in the first transmission band.

12 Claims, 9 Drawing Sheets

(56) References Cited

U.S. PATENT DOCUMENTS

| | | | | |
|---|---|---|---|---|
| 8,873,041 B1* | 10/2014 | Chai | ...................... | G01J 3/44 |
| | | | | 356/301 |
| 2012/0162642 A1* | 6/2012 | Watson | ................. | G01N 21/65 |
| | | | | 356/311 |
| 2014/0312212 A1* | 10/2014 | Schappacher | ......... | G01J 3/0224 |
| | | | | 250/225 |
| 2017/0307440 A1* | 10/2017 | Urban | ................ | G01N 21/6458 |
| 2019/0323891 A1 | 10/2019 | Sumpf et al. | | |

OTHER PUBLICATIONS

Andrew P. Shreve, et al., "Effective Rejection of Fluorescence Interference in Raman Spectroscopy Using a Shifted Excitation Difference Technique", Applied Spectroscopy, vol. 46, No. 4, 1992, pp. 707-711.

* cited by examiner

RAMAN SPECTROSCOPY DEVICE AND RAMAN SPECTROSCOPY MEASUREMENT METHOD

CROSS-REFERENCE OF RELATED APPLICATIONS

This application is the U.S. National Phase under 35 U.S.C. § 371 of International Patent Application No. PCT/JP2022/013656, filed on Mar. 23, 2022, which in turn claims the benefit of Japanese Patent Application No. 2021-060458, filed on Mar. 31, 2021, the entire disclosures of which Applications are incorporated by reference herein.

TECHNICAL FIELD

The present disclosure relates to a Raman spectroscopy device and a Raman spectroscopy measurement method for performing Raman spectroscopy measurement that is effective to obtain information such as molecular species of a sample.

BACKGROUND ART

Raman spectroscopy measurement refers to an evaluation technique in which a sample that is a measurement target is irradiated with excitation light, Raman scattered light generated from the sample is split, and information regarding the sample is acquired. Raman spectroscopy device refers to a device that performs the Raman spectroscopy measurement. Also, Raman spectroscopy system refers to a system configured to perform the Raman spectroscopy measurement.

In the Raman spectroscopy measurement, fluorescent light may be generated from the sample together with the Raman scattered light. That is, a spectrum obtained by measuring the light generated from the sample includes a Raman light scattering spectrum and a fluorescent light spectrum. The fluorescent light contains less information specific to the sample than the Raman scattered light. Also, it is often the case that the fluorescent light has an intensity higher than that of the Raman scattered light, and may disturb splitting of the Raman scattered light. For this reason, there is demand for a technique for removing fluorescent light components from a measurement result obtained from the Raman spectroscopy measurement, and extracting Raman scattered light components.

As conventional techniques, the following methods for removing fluorescent light components from a measurement result obtained from the Raman spectroscopy measurement are known.

A first method is a method in which the wavelength of excitation light is increased. This method utilizes the fact that fluorescent light is unlikely to be excited at long wavelengths. In order to implement this method, as a light source, a laser that emits excitation light at a wavelength in the red light or near-infrared region such as, for example, a helium-neon (He—Ne) laser with a center wavelength of 633 nm, a DPSS (Diode Pumped Solid State) laser with a center wavelength of 785 nm, or an Nd-doped YAG (Yttrium Aluminum Garnet) laser with a center wavelength of 1064 nm is used.

A second method is a SERDS (shifted-excitation Raman difference spectroscopy) method as disclosed in, for example, Non Patent Literature (NPTL) 1.

The SERDS method includes: performing a measurement that uses excitation light that has a first frequency and a measurement that uses excitation light that has a second frequency that is close to but slightly different from the first frequency; and obtaining a difference between spectrums obtained as a result of the two measurements.

A fluorescent light spectrum is not so strongly dependent on the frequency of excitation light. In a Raman light scattering spectrum, on the other hand, when the frequency of excitation light is shifted by an amount corresponding to $\Delta f$, the frequency of Raman scattered light is also shifted by the amount corresponding to $\Delta f$. For this reason, fluorescent light components are substantially removed from the difference between spectrums obtained as a result of the measurements, and only components derived from the Raman scattered light remain. By performing mathematical processing on the difference between spectrums obtained as a result of the measurements, the original Raman light scattering spectrum can be estimated.

A third method is a method, as disclosed in, for example, Patent Literature (PTL) 1, in which excitation light that has a broad line width is used. This method includes: performing a measurement that uses first excitation light that has a narrow line width and a measurement that uses second excitation light that has a broad line width; and obtaining a difference between spectrums obtained as a result of the two measurements.

A Raman scattering peak line width in a Raman light scattering spectrum increases according to the line width of excitation light. Accordingly, by using excitation light that has a sufficiently broad line width, the Raman scattering peak also has a broad shape, and thus, through averaging, the Raman scattering peak can be made less noticeable. On the other hand, a fluorescent light spectrum is not so strongly dependent on the line with of excitation light. For this reason, a difference between spectrums obtained as a result of the measurements is substantially similar to the Raman light scattering spectrum.

CITATION LIST

Patent Literature

[PTL 1]
  U.S. Pat. No. 8,159,665

Non Patent Literature

[NPL 1]
  A. Shreve, N. Cherepy, and R. Mathies, "Effective rejection of fluorescence interference in Raman spectroscopy using a shifted excitation difference technique," Appl. Spectrosc., The Optical Society, 1992, Vol. 46, No. 4, pp. 707 to 711

SUMMARY OF INVENTION

Technical Problem

The present disclosure provides a Raman spectroscopy device and a Raman spectroscopy measurement method, with which it is possible to effectively remove the influence of fluorescent light in Raman spectroscopy measurement.

Solution to Problem

A Raman spectroscopy device according to one aspect of the present disclosure includes: an irradiator that irradiates a measurement target with first excitation light that has a first line width and second excitation light that has a second line width broader than the first line width; a spectroscopy measurer that performs spectroscopy measurement on first measurement light and second measurement light that are incident on the spectroscopy measurer, the first measurement light being emitted from the measurement target when the measurement target is irradiated with the first excitation light, the second measurement light being emitted from the measurement target when the measurement target is irradiated with the second excitation light; and a first selective optical system that has a first transmission band and a first stop band, and filters the first measurement light and the second measurement light that are incident on the spectroscopy measurer, wherein the first excitation light and the second excitation light each have a main component in the first stop band, and the second excitation light has substantially no component in the first transmission band.

A Raman spectroscopy measurement method according to one aspect of the present disclosure includes: acquiring a first spectrum by performing spectroscopy measurement on the first measurement light; acquiring a second spectrum by performing spectroscopy measurement on the second measurement light; and calculating a third spectrum that is a difference between one of the first spectrum or the second spectrum multiplied by a predetermined coefficient an other of the first spectrum or the second spectrum.

Advantageous Effects of Invention

According to the aspects of the present disclosure, it is possible to effectively remove the influence of fluorescent light in Raman spectroscopy measurement.

Figure 1:
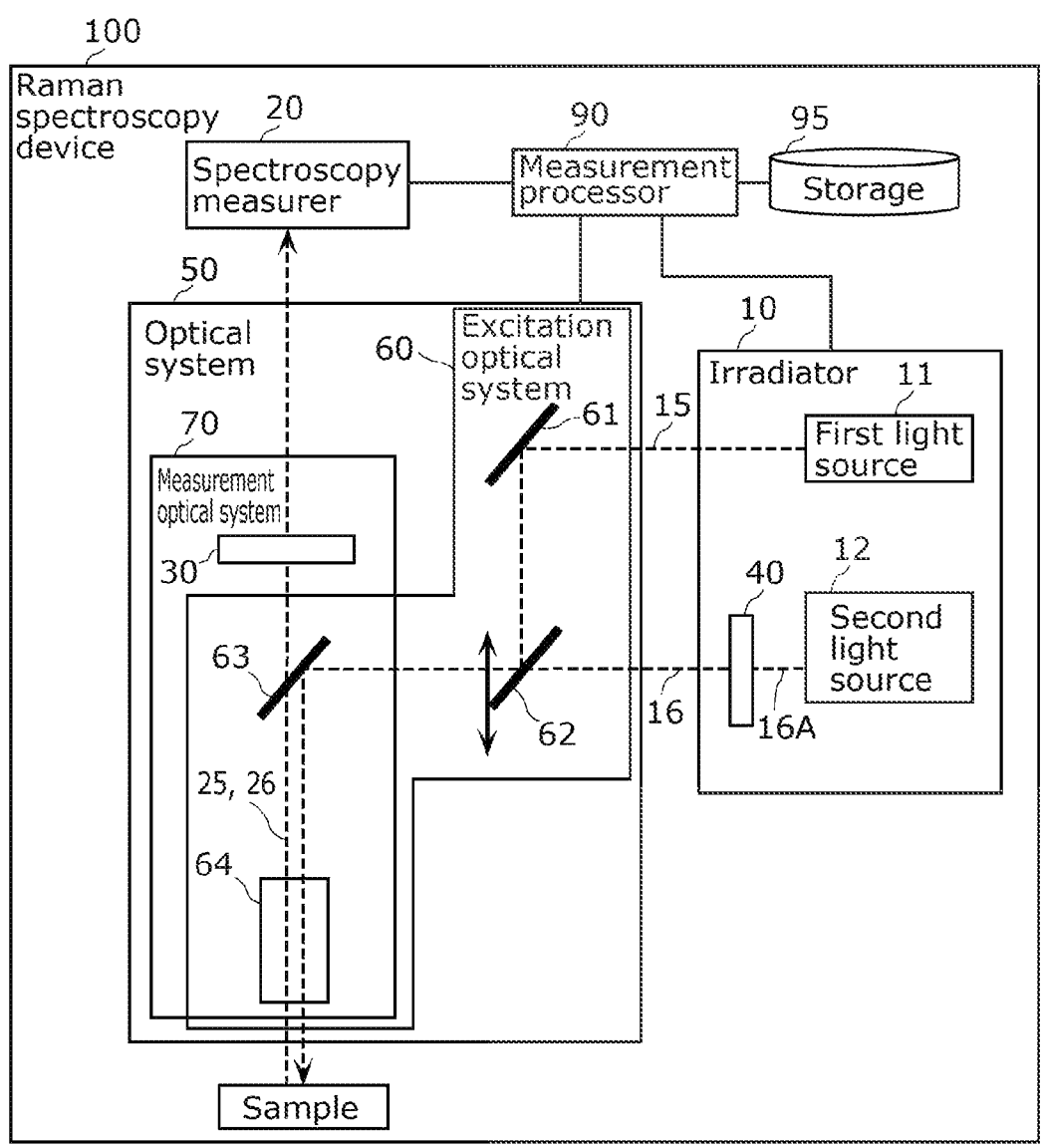
FIG. 1 is a block diagram showing an example of a configuration of a Raman spectroscopy device according to an embodiment.

DESCRIPTION OF EMBODIMENT (Circumstances Leading to the Present Disclosure)

As described above, there is demand for a technique for removing fluorescent light components from a measurement result obtained from Raman spectroscopy measurement. The inventors of the present application found that the above-described conventional methods for removing fluorescent light components from a measurement result obtained from Raman spectroscopy measurement have the following problems.

The intensity of Raman scattered light is inversely proportional to the fourth power of wavelength. For this reason, in the first method described above in which the wavelength of excitation light is increased, the intensity of Raman scattered light abruptly decreases as the wavelength of excitation light is increased. For example, without taking into consideration the fact that samples have different absorption coefficients, the intensity of Raman scattered light generated by excitation performed by using a helium-neon laser with a center wavelength of 633 nm is $1/14$ or less of the intensity of Raman scattered light generated by excitation performed by using an ultraviolet helium-cadmium (He—Cd) laser with a center wavelength of 325 nm.

For this reason, by simply performing excitation with excitation light at a wavelength in the red light or near-infrared region, it may be difficult to measure Raman scattered light that has a sufficient intensity. Also, depending on the sample, fluorescent light may be generated even by excitation with excitation light at a long wavelength.

In the second method described above in which the SERDS method is used, it is necessary to prepare two types of lasers that have slightly different frequencies. It is difficult to obtain such lasers. In addition, a differential spectrum obtained using the SERDS method is significantly different from the original Raman light scattering spectrum. For this reason, it is difficult to intuitively interpret the differential spectrum. To interpret the differential spectrum, it is necessary to perform, for example, operations of performing computation using a computer or the like and restoring the differential spectrum to be closer to the original spectrum. In this case, the computation processing requires many computational resources. Also, depending on the obtained Raman light scattering spectrum, it is difficult to restore the differential spectrum to be closer to the original spectrum.

In the third method described above in which a light source that has a broad line width is used, a light source that has a sufficiently broad line width is required in order to average peaks in the Raman light scattering spectrum. However, the inventors of the present application found that simply using a light source that has a sufficiently broad line width still causes some problems.

A first problem is that unmeasurable peaks are generated in the originally existing Raman light scattering spectrum. In FIG. 3b of PTL 1, the presence of a Raman scattering peak is observed around 500 cm$^{-1}$ in a spectrum obtained from measurement performed by excitation using a light source that has a narrow line width. On the other hand, this Raman scattering peak overlaps a large peak in a spectrum obtained from measurement performed by excitation using a light source that has a broad line width, and thus, in the differential spectrum shown in FIG. 3b of PTL 1, this Raman scattering peak has disappeared. The large peak in the overlapping portion is derived from Rayleigh scattered light generated when a sample is excited using a light source that has a broad line width. The Rayleigh scattered light is scattered light that has an intensity higher than that of Raman scattered light that has the same wavelength as that of excitation light.

For example, in the analysis of carbon nanotubes, a Raman scattering peak that appears in a wavenumber range of 100 cm$^{-1}$ to 400 cm$^{-1}$ is called radial breathing mode (RBM), and is information important to identify the chirality of carbon nanotubes. However, with the method disclosed in PTL 1, it is not possible to acquire information regarding such as a low-wavenumber Raman scattering peak.

A second problem is a variation in the fluorescent light spectrum. The inventors of the present application found that the fluorescent light spectrum may vary depending on the wavelength used for excitation. In the case where fluorescent light is induced by using a light source that has a broad line width, when the fluorescent light spectrum varies depending on each of the wavelengths of excitation light of the light source that has a broad line width, the fluorescent light spectrum varies according to the line width. Accordingly, a problem arises in that the fluorescent light spectrum obtained by using the light source that has a narrow line width and the fluorescent light spectrum obtained by using the light source that has a broad line width do not match each other, and thus even when a difference therebetween is obtained, the fluorescent light spectrums does not disappear.

As described above, the inventors of the present application found that, with the conventional methods, even when the influence of fluorescent light is removed using a light source that has a broad line width, it may not be possible to accurately acquire the original Raman light scattering spectrum.

To address the problems described above, the present disclosure provides a Raman spectroscopy device and a Raman spectroscopy measurement method, with which it is possible to effectively remove the influence of fluorescent light in Raman spectroscopy measurement.

An overview of one or more aspects of the present disclosure will be given below.

A Raman spectroscopy device according to one aspect of the present disclosure includes: an irradiator that irradiates a measurement target with first excitation light that has a first line width and second excitation light that has a second line width broader than the first line width; a spectroscopy measurer that performs spectroscopy measurement on first measurement light and second measurement light that are incident on the spectroscopy measurer, the first measurement light being emitted from the measurement target when the measurement target is irradiated with the first excitation light, the second measurement light being emitted from the measurement target when the measurement target is irradiated with the second excitation light; and a first selective optical system that has a first transmission band and a first stop band, and filters the first measurement light and the second measurement light that are incident on the spectroscopy measurer, wherein the first excitation light and the second excitation light each have a main component in the first stop band, and the second excitation light has substantially no component in the first transmission band.

With this configuration, the second excitation light that is excitation light that has a broad line width does not have a main component in the first transmission band, and thus almost no scattered light component that has a high intensity such as Rayleigh scattered light in the second measurement light to be incident on the spectroscopy measurer is included in the first transmission band that transmits light in the wavelength range used by the spectroscopy measurer to perform spectroscopy measurement. For this reason, it is possible to acquire a spectrum using the second measurement light in which there is almost no component derived from Rayleigh scattering caused by the second excitation light. Accordingly, even when the spectrum obtained by using the second measurement light is subtracted from the spectrum obtained by using the first measurement light, it is possible to suppress a situation in which the Raman light scattering spectrum of the first measurement light disappears due to the influence of the second excitation light. Accordingly, the Raman spectroscopy device according to the present aspect can effectively remove the influence of fluorescent light in Raman spectroscopy measurement.

Also, for example, the irradiator may include: a light source that emits light source light; and a second selective optical system that has a second transmission band and a second stop band, and filters the light source light. The measurement target may be irradiated with the light source light that has been filtered by the second selective optical system as the second excitation light.

With this configuration, it is possible to easily configure the irradiator that can irradiate the measurement target with the second excitation light that has a desired spectrum.

Also, for example, in a wavenumber space, the first excitation light may be located on a low wavenumber side relative to a center of a wavenumber range that defines a half width of the second excitation light.

With this configuration, it is possible to reduce the wavenumber range in which the Raman scattering peak caused by the first excitation light generated on the low wavenumber side of the first excitation light overlaps the second excitation light.

Also, for example, in a wavenumber space, more components of the second excitation light may be located on a side where the first excitation light is located relative to a center of a wavenumber range that defines a half width of the second excitation light than on a side where the first excitation light is not located.

With this configuration, it is possible to increase the similarity between the fluorescent light spectrum of the first excitation light and the fluorescent light spectrum of the second excitation light.

Also, for example, the first excitation light may have a center wavelength of 600 nm or less.

Excitation light in a shorter wavelength range has smaller excitation light wavelength dependence of the fluorescent light spectrum emitted from the measurement target. For this reason, by setting the center wavelength of the first excitation light to a short wavelength of 600 nm or less, it is possible to suppress a reduction in the similarity between the fluorescent light spectrum of the first excitation light and the fluorescent light spectrum of the second excitation light caused by a difference in line width between the first excitation light and the second excitation light.

Also, for example, the second line width may be 200 cm$^{-1}$ or less.

With this configuration, the line width of the second excitation light is within a range of fluctuation of thermal energy of the measurement target at a temperature close to room temperature. For this reason, a difference is unlikely to occur between the energy when the first excitation light that has a narrow line width is absorbed and the energy when the second excitation light that has a broad line width is absorbed. As a result, even when the wavelength of the second excitation light is included in the wavelength range that has large excitation light wavelength dependence of the fluorescent light spectrum emitted from the measurement target, the fluorescent light spectrum is unlikely to be affected by the line width, and it is therefore possible to increase the similarity between a fluorescent light spectrum of the first excitation light and a fluorescent light spectrum of the second excitation light, the fluorescent light spectrums being emitted from the measurement target.

Also, for example, the irradiator may be capable of changing the second line width.

With this configuration, even when the measurement target is irradiated with the second excitation light in the wavelength range in which the fluorescent light spectrum emitted from the measurement target is likely to vary due to the influence of line width, it is possible to change the second line width so as to reduce a change in the fluorescent light spectrum due to the influence of line width.

Also, for example, the irradiator may be capable of changing a wavelength of the first excitation light and a wavelength of the second excitation light, and change the wavelength of the second excitation light according to a change in the wavelength of the first excitation light, and the first selective optical system may be capable of changing a range of the first transmission band and a range of the first stop band, and change the range of the first transmission band and the range of the first stop band according to a change in the wavelength of the first excitation light.

With this configuration, even when the measurement target is irradiated with the first excitation light and the second excitation light in the wavelength range in which the fluorescent light spectrum emitted from the measurement target is likely to vary due to the influence of line width, it is possible to change the wavelength of the first excitation light so as to reduce a change in fluorescent light spectrum due to the influence of line width, and also correspondingly change the wavelength of the second excitation light, the range of the first transmission band, and the range of the first stop band.

Also, a Raman spectroscopy measurement method according to one aspect of the present disclosure is a Raman spectroscopy measurement method performed by the Raman spectroscopy device described above, the Raman spectroscopy measurement method including: acquiring a first spectrum by performing spectroscopy measurement on the first measurement light; acquiring a second spectrum by performing spectroscopy measurement on the second measurement light; and calculating a third spectrum that is a difference between one of the first spectrum or the second spectrum multiplied by a predetermined coefficient and an other of the first spectrum or the second spectrum.

With this configuration, as a result of Raman spectroscopy measurement being performed by using the Raman spectroscopy device described above, it is possible to acquire, as the third spectrum, a Raman light scattering spectrum from which the influence of fluorescent light has been effectively removed.

Also, for example, the Raman spectroscopy measurement method described above may include determining, based on the third spectrum calculated, whether fluorescent light has been sufficiently removed.

With this configuration, for example, when removal of fluorescent light from the third spectrum is insufficient, it is possible to inform the user of the Raman spectroscopy device of the determination result.

Also, for example, the Raman spectroscopy measurement method described above may include, when it is determined in the determining that the fluorescent light has not been sufficiently removed, changing at least one of (i) the wavelength of the first excitation light and the wavelength of the second excitation light or (ii) the second line width. Also, after the changing, the acquiring of the first spectrum, the acquiring of the second spectrum, and the calculating may be performed again.

With this configuration, when removal of fluorescent light from the third spectrum is insufficient, as a result of at least appropriate one of (i) the wavelength of the first excitation light and the wavelength of the second excitation light or (ii) the second line width being changed, it is possible to acquire the third spectrum in which the influence of fluorescent light is further reduced.

Also, for example, the Raman spectroscopy measurement method described above may include determining the wavelength of the first excitation light and the wavelength of the second excitation light based on information indicating the measurement target. Also, the acquiring of the first spectrum, the acquiring of the second spectrum, and the calculating may be performed based on a result determined in the determining of the wavelength of the first excitation light and the wavelength of the second excitation light.

With this configuration, as a result of the wavelength of the first excitation light and the wavelength of the second excitation light suitable for the absorption spectrum and the fluorescent light spectrum of the measurement target being determined based on the information indicating the measurement target, it is possible to acquire the third spectrum in which the influence of fluorescent light is further reduced.

Hereinafter, an embodiment will be described with reference to the drawings.

Note that the embodiment described below shows a generic or specific example of the present disclosure. The numerical values, shapes, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. Also, in the diagrams, structural elements that are substantially the same are given the same reference numerals, and a redundant description may be omitted or simplified.

Also, in the specification of the present application, the terms that describe the relationship between elements, the terms that describe the shape of elements, and numerical value ranges are expressions that not only have a strict meaning but also encompass a substantially equal range, for example, a margin of about several percent.

Also, in the specification of the present application, unless otherwise stated, the term "light" means not only visible light, but also encompasses ultraviolet rays and infrared rays.

Also, the following relationships are established for light wavelength, light frequency, light wavenumber, and photon energy from among physical quantities of light.

$$(\text{Light wavelength}) = 1/(\text{light wavenumber})$$

$$(\text{Light frequency}) = (\text{light speed})/(\text{light wavelength})$$

$$(\text{Photon energy}) = (\text{planck constant}) \times (\text{light frequency})$$

Accordingly, when a light property is described by using any one of wavelength, frequency, wavenumber, or photon energy, the other properties are determined. It is natural to designate the ranges of properties for obtaining the advantageous effects of the present disclosure by using different physical quantities. Accordingly, in the specification of the present application, the ranges are designated by using appropriate physical quantities as appropriate.

In the specification of the present application, a description will be given focusing on differences from conventional Raman spectroscopy devices. Accordingly, a description of elements and the like that are required for a Raman spectroscopy device of the present disclosure to function, but are used in conventional devices and obvious for practitioners of the invention will be omitted. In addition, the diagrams are provided to illustrate the principles and concept of the present disclosure, and thus the shapes, sizes, and dimensional ratios of structural elements may be different from the actual shapes, sizes, and dimensional ratios.

Embodiment

[Overview of Raman Spectroscopy Device]

FIG. 1 is a block diagram showing an example of a configuration of Raman spectroscopy device 100 according to the present embodiment.

Raman spectroscopy device 100 includes at least irradiator 10, spectroscopy measurer 20, and first selective optical system 30. Irradiator 10 irradiates a sample that is an example of a measurement target with first excitation light 15 and second excitation light 16. Spectroscopy measurer 20 performs spectroscopy measurement on first measurement light 25 emitted from the sample when the sample is irradiated with first excitation light 15 and second measurement light 26 emitted from the sample when the sample is irradiated with second excitation light 16. First selective optical system 30 filters first measurement light 25 and second measurement light 26 to be incident on spectroscopy measurer 20. As shown in FIG. 1, in the present embodiment, Raman spectroscopy device 100 includes irradiator 10, spectroscopy measurer 20, optical system 50, measurement processor 90, and storage 95. A few constituent components may be shared by an element and another element. In the present embodiment, optical system 50 includes, for example, excitation optical system 60 and measurement optical system 70 that share a few constituent components. Also, first selective optical system 30 constitutes, for example, a part of measurement optical system 70.

Hereinafter, structural elements will be described in detail.

[Irradiator]

Figure 2:
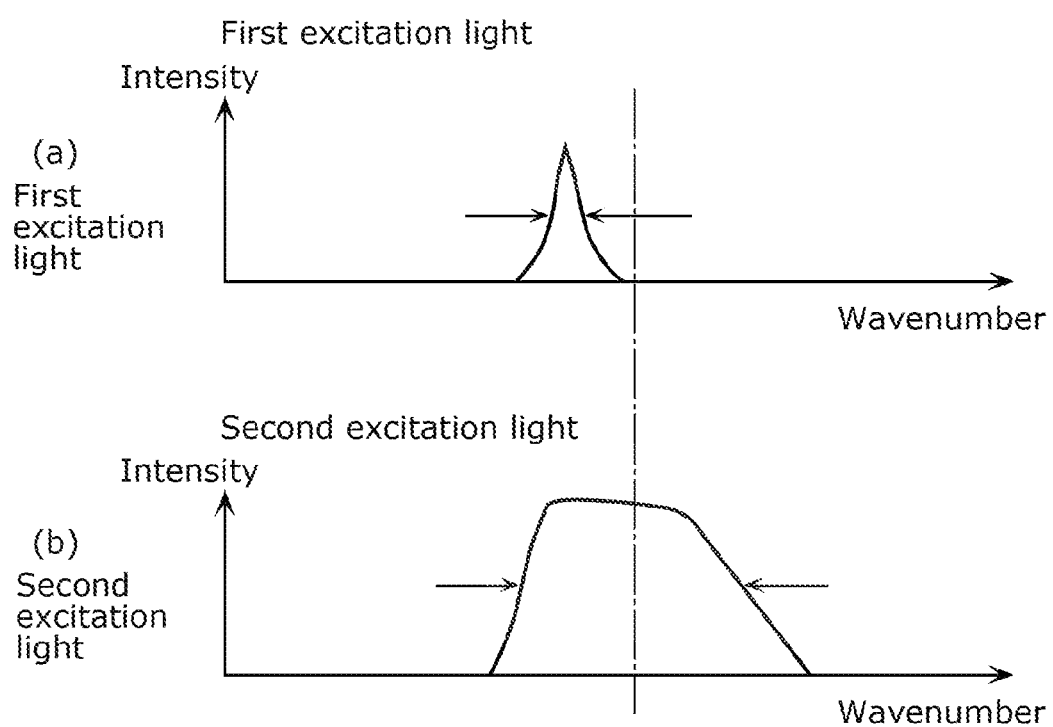
FIG. 2 is a diagram showing an example of a spectrum of first excitation light and an example of a spectrum of second excitation light according to the embodiment.

Irradiator 10 includes, for example, first light source 11, second light source 12, and second selective optical system 40. Irradiator 10 irradiates the sample with first excitation light 15 that has a first line width and second excitation light 16 that has a second line width. FIG. 2 is a diagram showing an example of a spectrum of first excitation light 15 and an example of a spectrum of second excitation light 16. (a) in FIG. 2 shows an example of a spectrum of first excitation light 15 in a wavenumber space, and (b) in FIG. 2 shows an example of a spectrum of second excitation light 16 in a wavenumber space. As used herein, in the specification of the present application, the term "line width" means, when light intensity distribution is viewed in a wavenumber space, or in other words, in a spectrum in a wavenumber space, a width of a wavenumber range in which half the maximum intensity is distributed (in short, a half width in the wavenumber space). For example, a width of a wavenumber range between opposing arrows shown in each of (a) and (b) in FIG. 2 is referred to as line width. As shown in (a) and (b) in FIG. 2, the second line width is broader than the first line width.

First light source 11 is a light source for irradiating the sample with excitation light that excites Raman scattering. First light source 11 functions to emit first excitation light 15.

First excitation light 15 has a first line width that is narrower than the second line width.

A Raman light scattering spectrum obtained through measurement performed by using a spectroscopy device such as spectroscopy measurer 20 is determined primarily by the broadening of vibrations specific to the sample, the line width of the excitation light source, and the resolution of the spectroscopy device. The resolution of the Raman light scattering spectrum is determined by one of these factors that has the largest broadening. For this reason, the line width of first excitation light 15 is set so as to be, for example, the same as or narrower than the wavenumber resolution of the Raman light scattering spectrum the user of Raman spectroscopy device 100 wants to observe. In an ordinary Raman light scattering spectrum, the broadening of vibrations specific to the sample is 100 cm$^{-1}$ or less, and thus the first line width is, for example, 100 cm$^{-1}$ or less. In order to observe vibrations specific to the sample that has narrower broadening than that, the line width of first excitation light 15 may be narrower than 100 cm$^{-1}$, and may be, for example, 10 cm$^{-1}$ or less.

As a method for narrowing the first line width, any of the following methods can be used: a method in which a laser that originally emits light that has a narrow line width such as a gas laser (e.g., an argon laser or a He—Ne laser) is used as a light source; a method in which an external resonator that has a significant gain only in a narrow wavenumber range is combined with a laser diode that can emit light that has a broad line width; a method in which an optical element that can provide only a narrow wavenumber range such as a volume holographic grating is combined with a light source that can emit light that has a broad line width; and the like.

In order to reduce components of first excitation light 15 that are included in transmission band 120 of first selective optical system 30, which will be described later, irradiator 10 may include, for example, a band pass filter, a short pass filter, a monochromator, or the like that allows the light from first light source 11 to pass therethrough.

As first light source 11, any light source can be freely selected as long as the light source can generate Raman scattered light the user of Raman spectroscopy device 100 wants to measure, and the Raman scattered light can be detected by spectroscopy measurer 20. Examples of the light source that can be used as first light source 11 include: gas lasers such as a He—Cd laser, an argon laser, and a He—Ne laser; wavelength tunable lasers such as a DPSS laser (laser diode excitation solid-state laser), an external resonator semiconductor laser, and a titanium-doped sapphire laser; wavelength tunable light sources such as an OPO (Optical Parametric Oscillator); and the like.

It is often the case that it is effective to use short wavelength excitation light when removing fluorescent light generated from the sample together with Raman scattered light by using Raman spectroscopy device 100 according to the present embodiment. The reason will be described later. For this reason, first excitation light 15 may have a center wavelength in the wavelength range of ultraviolet rays, blue light, and green light, specifically, in a range of 200 nm or more and 550 nm or less, instead of the wavelength range of red light and infrared rays used in the first method for suppressing fluorescent light described above. Examples of a light source that can emit light that has a center wavelength in this wavelength range include a He—Cd laser (ultraviolet rays with a center wavelength of 325 nm and blue light that has a center wavelength of 442 nm), an argon laser (blue light that has a center wavelength of 488 nm), a DPSS laser (green light that has a center wavelength of 532 nm), and the like. In the specification of the present application, the term "center wavelength" means a wavelength at the center of the wavelength range that defines the half width of light.

Also, in Raman spectroscopy device 100, first light source 11 may include a plurality of light sources of different wavelengths. As will be described later, it is effective to change wavelength such as the center wavelength of first excitation light 15 emitted by first light source 11 depending on the sample in order to effectively remove fluorescent light components emitted from the sample from the spectrum obtained through measurement. That is, irradiator 10 may be configured to be capable of changing the wavelength of first excitation light 15.

In the case where first light source 11 includes a plurality of light sources of different wavelengths, Raman spectroscopy device 100 may include an optical component such as a movable mirror, a control device, and the like to switch the light sources that irradiate the sample with light. Also, Raman spectroscopy device 100 may include an optical component that merges optical paths of first excitation light 15 of different wavelengths such as a dichroic mirror. Also, first light source 11 may be configured to be capable of changing wavelength by using a wavelength tunable laser such as a titanium-doped sapphire laser, an argon laser that can emit light of a plurality of wavelengths, a wavelength tunable light source such as an OPO, or the like.

Also, irradiator 10 may include an intensity adjustment mechanism for adjusting the intensity of first excitation light 15 that includes an ND (Neutral Density) filter, a diaphragm, and the like. Also, irradiator 10 may include an intensity measurement mechanism for measuring the intensity of first excitation light 15 such as a power meter. The intensity adjustment mechanism and the intensity measurement mechanism may be included in excitation optical system 60, instead of irradiator 10. Also, the intensity adjustment mechanism and the intensity measurement mechanism may be used for second excitation light 16.

Next, second light source 12 and second selective optical system 40 will be described. Second light source 12 is a light source used primarily to acquire a fluorescent light spectrum. Second light source 12 functions to emit light source light 16A.

Figure 3:
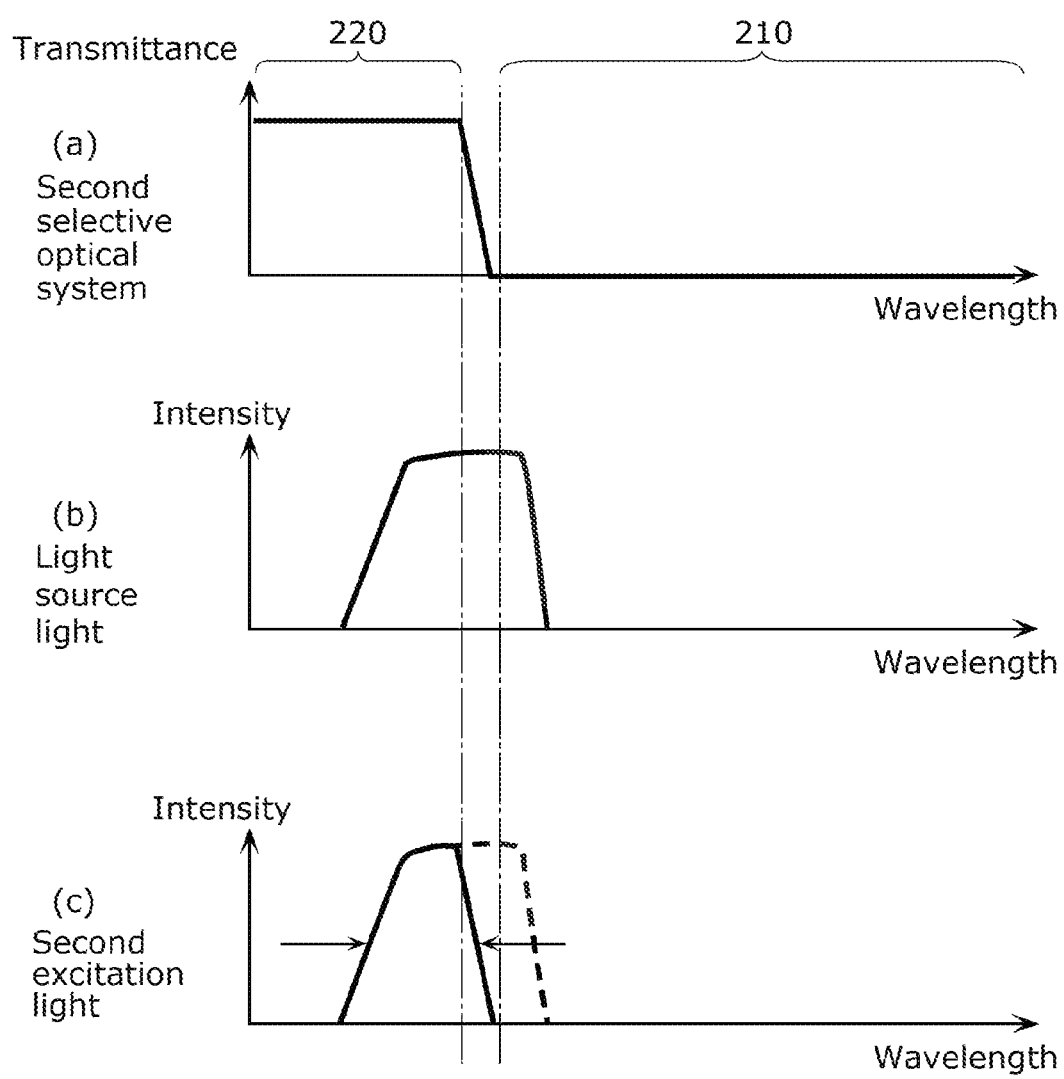
FIG. 3 is a diagram showing examples of (i) a transmission spectrum of a second selective optical system and (ii) spectrums of light source light and second excitation light according to the embodiment.

In the present embodiment, when light source light 16A passes through second selective optical system 40, light source light 16A is filtered and turned into second excitation light 16. That is, irradiator 10 irradiates the sample with light source light 16A that has been filtered by second selective optical system 40 as second excitation light 16. FIG. 3 is a diagram showing examples of (i) a transmission spectrum of second selective optical system 40 and (ii) spectrums of light source light 16A and second excitation light 16. (a) in FIG. 3 shows an example of a transmission spectrum of second selective optical system 40. (b) in FIG. 3 shows an example of a spectrum of light source light 16A. (c) in FIG. 3 shows an example of a spectrum of second excitation light 16. For example, as a result of light source light 16A that has the spectrum shown in (b) in FIG. 3 being filtered by second selective optical system 40 that has the transmission spectrum shown in (a) in FIG. 3, second excitation light 16 that has the spectrum shown in (c) in FIG. 3 is generated. A broken line shown in (c) in FIG. 3 indicates the spectrum of light source light 16A before being filtered by second selective optical system 40. Second selective optical system 40 attenuates, for example, components on the long wavelength side of light source light 16A.

As second light source 12, for example, a light emitting diode (LED), a halogen lamp, a xenon lamp, a superluminescent diode, a supercontinuum light source, a laser diode, or the like can be used. Also, second light source 12 may be a light source configured to broaden wavenumber range by irradiating a phosphor or the like with light source light that has a narrow wavenumber range.

In the case where the present embodiment is carried out by using a confocal microscope configuration, irradiator 10 is configured such that the irradiation range of first excitation light 15 and the irradiation range of second excitation light 16 are about the same. In this case, first light source 11 and second light source 12 may be, for example, light sources that have narrow light emission ranges, and a superluminescent diode, a supercontinuum light source, or a laser diode may be used as second light source 12.

Second light source 12 may share some or all elements with first light source 11. The configuration of first light source 11 or the method for driving first light source 11 may be changed to cause first light source 11 to also function as second light source 12. That is, irradiator 10 may include only first light source 11 out of first light source 11 and second light source 12 such that first light source 11 emits first excitation light 15 and either second excitation light 16 or light source light 16A to be turned into second excitation light 16.

As an example for causing first light source 11 to also function as second light source 12, an external resonator laser can be used as first light source 11. The external resonator laser includes a gain chip that is a type of laser diode, a diffraction grating, and the like. Out of light in a broad wavenumber range emitted by the gain chip, only light in a specific wavenumber range is returned to the gain chip by the diffraction grating, and the light in the specific wavenumber range can thereby be laser-emitted. For this reason, the wavenumber range of light emitted by the external resonator laser can be broadened by performing any one of the following: removing the diffraction grating; preventing the diffraction grating from returning the light to the gain chip; or broadening the wavenumber range in which the diffraction grating returns the light to the gain chip.

As another example for causing first light source 11 to also function as second light source 12, the method for driving a laser diode can be changed. The laser diode emits light corresponding to an injection current. When the injection current is a threshold value or more, the laser diode enters a laser emission mode, and emits light that has a narrow line width. On the other hand, when the injection current is equal to or less than the threshold value, the laser diode enters a spontaneous emission mode, and emits light that has a broad line width. Accordingly, the wavenumber range can be changed by controlling the injection current.

As still another example for causing first light source 11 to also function as second light source 12, the line width of excitation light can be changed as time average. When the center wavelength of excitation light varies during a measurement time in which spectroscopy measurement is performed, measurement results obtained at each center wavelength are accumulated in a detector included in spectroscopy measurer 20. For this reason, even when a light source that emits light that has a narrow line width at a certain time is used, as long as the light source can change the center wavelength during the measurement time in which spectroscopy measurement is performed, this is equivalent to using a light source that has a broad line width. As an example of the light source that can change the center wavelength, for example, a wavelength tunable laser such as a titanium-doped sapphire laser, a wavelength tunable light source such as an OPO, or the like can be used.

Second selective optical system 40 is an optical system whose transmittance varies according to the wavelength of light. Second selective optical system 40 filters light source light 16A. With second selective optical system 40, it is possible to easily adjust the spectrum of second excitation light 16 to have a desired line width, a desired wavelength, and the like. As shown in (a) in FIG. 3, second selective optical system 40 has stop band 210 that is an example of a second stop band and transmission band 220 that is an example of a second transmission band. The average transmittance of transmission band 220 is higher than the average transmittance of stop band 210. The average transmittance of transmission band 220 is, for example, 100 times or more higher than the average transmittance of stop band 210.

The transmittance of stop band 210 of second selective optical system 40 is, for example, 1% or less, and may be 0.01% or less. The transmittance of transmission band 220 of second selective optical system 40 is, for example, 80% or more, and may be 90% or more.

The wavelength range of stop band 210 includes a wavelength range of a component the user of Raman spectroscopy device 100 intends to measure in the Raman scattering induced by first excitation light 15. The wavelength range of a component the user of Raman spectroscopy device 100 intends to measure will be described later.

The wavelength range of transmission band 220 includes, for example, a wavelength range in which first excitation light 15 has components, and also includes at least a portion of a wavelength range in which light source light 16A has components.

Figure 4:
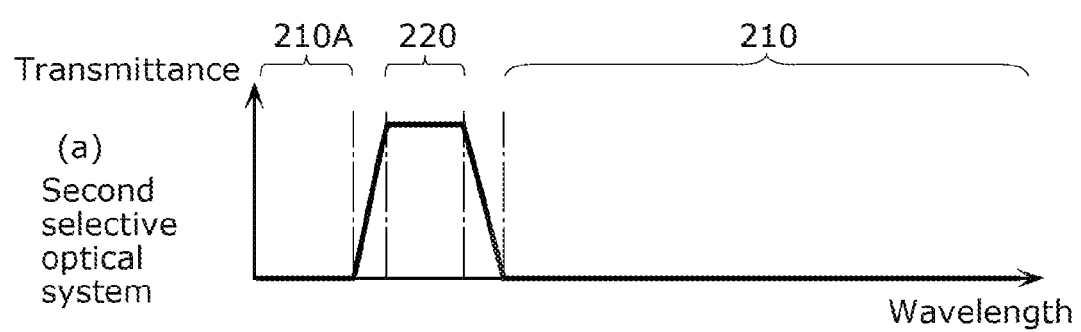
FIG. 4 is a diagram showing another example of a transmission spectrum of the second selective optical system according to the embodiment.

Second selective optical system 40 has at least one stop band 210 on the long wavelength side of transmission band 220. Second selective optical system 40 may further have another stop band. FIG. 4 is a diagram showing another example of a transmission spectrum of second selective optical system 40.

As shown in FIG. 4, second selective optical system 40 may have stop band 210, stop band 210A, and transmission band 220. Stop band 210A is a stop band different from stop band 210, and is provided on the short wavelength side of transmission band 220. Stop band 210A can be used to, for example, limit the line width of second excitation light 16. As will be described later, it is effective to limit the line width of second excitation light 16 in order to effectively remove fluorescent light components emitted from the sample.

Second selective optical system 40 may be configured by using, for example, a short pass filter composed of a colored glass filter or a dielectric multilayer film, a dichroic mirror, a monochromator that includes a diffraction grating or a spectral prism, or the like.

In the case where second selective optical system 40 further includes stop band 210A that is a stop band different from stop band 210 as shown in FIG. 4, second selective optical system 40 may be configured by using a band pass filter, a monochromator, or the like. Also, second selective optical system 40 may be configured to be capable of changing the width of transmission band 220 by including a combination of a short pass filter that defines stop band 210 and a long pass filter that defines stop band 210A that is a stop band different from stop band 210, and a mechanism that can exchange at least one of the short pass filter or the long pass filter. Alternatively, second selective optical system 40 may also be configured to be capable of changing the width of transmission band 220 by including a plurality of band pass filters of transmission band 220, and a mechanism that can exchange the plurality of band pass filters with a filter wheel or the like. Alternatively, second selective optical system 40 may also be configured to be capable of changing the width of transmission band 220 by including a monochromator that can change the slit width.

The width of transmission band 220 affects the second line width of second excitation light 16. For this reason, as a result of second selective optical system 40 being configured to be capable of changing the width of transmission band 220, irradiator 10 can change the second line width of second excitation light 16. As will be described later, it is effective to change the second line width of second excitation light 16 depending on the sample in order to effectively remove fluorescent light components emitted from the sample.

Second selective optical system 40 is arranged such that light source light 16A emitted from second light source 12 is incident on second selective optical system 40 before light source light 16A is applied to the sample by excitation optical system 60. In the example shown in FIG. 1, second selective optical system 40 is arranged on an optical path of light source light 16A, specifically, the optical path of light source light 16A between second light source 12 and excitation optical system 60.

The wavelength ranges of transmission band 220 and stop band 210 (or transmission band 220, stop band 210, and stop band 210A) of second selective optical system 40 are associated with, for example, the wavelength of first excitation light 15 in order to change the wavelength of second excitation light 16. For this reason, in the case where irradiator 10 includes a mechanism that changes the wavelength of first excitation light 15, second selective optical system 40 may function to change the wavelength ranges of stop band 210 and transmission band 220 (or transmission band 220, stop band 210, and stop band 210A) according to a change in the wavelength of first excitation light 15. That is, irradiator 10 is capable of changing the wavelength of first excitation light 15 and the wavelength of second excitation light 16, and may change the wavelength of second excitation light 16 according to a change in the wavelength of first excitation light 15. For example, a changed range of transmission band 220 corresponding to a change in the wavelength of first excitation light 15 (the changed range may be, for example, the same amount of change as the change in the wavelength of first excitation light 15) may be set, and irradiator 10 may change the wavelength of second excitation light 16 according to a change in the wavelength of first excitation light 15 under control of measurement processor 90.

This function of second selective optical system 40 may be implemented by, for example, configuring second selective optical system 40 to include a plurality of filters and a filter wheel that switches the plurality of filters. In the case where first light source 11 includes a plurality of light sources of different wavelengths, for example, transmission bands 220 of the plurality of filters are set such that the plurality of filters form pairs with the plurality of light sources to have a relationship between the spectrum of first excitation light 15 and the spectrum of second excitation light 16, which will be described later.

Also, this function of second selective optical system 40 may be implemented by, for example, configuring second selective optical system 40 to include a mechanism that adjusts the angle or slit width of the diffraction grating or the spectral prism included in the monochromator. Also, this function of second selective optical system 40 may be implemented by, for example, configuring second selective optical system 40 to include a linear variable short pass filter that is designed such that the transmission properties are changed according to the position on which light source light 16A is incident, and a mechanism that adjusts the position of the linear variable short pass filter.

In the case where second light source 12 can emit second excitation light 16 that has an intended second line width, irradiator 10 does not necessarily need to include second selective optical system 40. Also, the function of changing the spectrum of second excitation light 16 may be implemented by configuring second light source 12 to include a mechanism that changes the wavelength of emitted light, as with first light source 11.

As described above, second excitation light 16 has a second line width that is broader than the first line width.

As a result of the second line width being broader than the first line width, in a spectrum obtained through measurement by irradiating the sample with second excitation light 16, a Raman scattering peak of the Raman light scattering spectrum is averaged. As described above, this is the principle disclosed in PTL 1. From the viewpoint of sufficiently averaging (or in other words, dispersing) Raman scattering peaks, the second line width may be, for example, broader than the broadening of vibrations specific to ordinary Raman scattering, and may be, for example, 100 cm$^{-1}$ or more, or 500 cm$^{-1}$ or more.

However, as will be described later, in the case where components of second excitation light 16 are included in a wavelength range in which the fluorescent light spectrum of the sample exhibits strong excitation light wavelength dependence, when the second line width is too broad, there may be a significant difference between a fluorescent light spectrum obtained by exciting the sample with first excitation light 15 and a fluorescent light spectrum obtained by exciting the sample with second excitation light 16.

In this case, for example, it is effective to limit the line width of second excitation light 16 within a range that corresponds to fluctuation of energy of the sample determined by the temperature of the sample. When the temperature of the sample is, for example, 300 K (kelvin), the line width that corresponds to the fluctuation of energy is about 210 cm$^{-1}$. When the sample is heated by excitation light and the temperature of the sample reaches 400 K, the line width that corresponds to the fluctuation of energy is about 280 cm$^{-1}$. Accordingly, for example, when the temperature of the sample is close to room temperature, by setting the second line width to be equal to or less than a value in a range of 210 cm$^{-1}$ to 280 cm$^{-1}$, a fluorescent light spectrum obtained by exciting the sample with first excitation light 15 and a fluorescent light spectrum obtained by exciting the sample with second excitation light 16 can have high similarity. For this reason, the second line width may be 200 cm$^{-1}$ or less.

Next, the relationship between the spectrum of first excitation light 15 and the spectrum of second excitation light 16 will be described. In the present embodiment, a suitable relationship between the center wavelength of first excitation light 15 and the spectrum of second excitation light 16 varies depending on, for example, whether the components of second excitation light 16 are included in a wavelength range in which the fluorescent light spectrum of the sample exhibits strong excitation light wavelength dependence.

In the case where the components of first excitation light 15 and second excitation light 16 are included in a wavelength range in which the fluorescent light spectrum of the sample exhibits strong excitation light wavelength dependence, as shown in examples of spectrums in FIG. 2, a wavenumber range that defines a half width of first excitation light 15 may be included in a wavenumber range that defines a half width of second excitation light 16. Also, in this case, as shown in FIG. 2, in a wavenumber space, first excitation light 15 is located, for example, on the low wavenumber side relative to the center of the wavenumber range that defines the half width of second excitation light 16. Also, in the wavenumber space, for example, more components of second excitation light 16 are located on a side where first excitation light 15 is located relative to the center of the wavenumber range that defines the half width of second excitation light 16 than on a side where first excitation light 15 is not located. In the example shown in FIG. 2, the side where first excitation light 15 is not located is the high wavenumber side relative to the center of the wavenumber range that defines the half width of second excitation light 16, and the side where first excitation light 15 is located is the low wavenumber side relative to the center of the wavenumber range that defines the half width of second excitation light 16. Also, the expression "first excitation light 15 is located" means that, for example, the center of the wavenumber range that defines the half width of first excitation light 15 is located. A principle of the relationship between the spectrum of first excitation light 15 and the spectrum of second excitation light 16 will be described later.

In the case where the components of first excitation light 15 and second excitation light 16 are included in a wavelength range in which the fluorescent light spectrum of the sample does not exhibit strong excitation light wavelength dependence, the wavelength range of second excitation light 16 can be selected independently of the wavelength range of first excitation light 15. That is, the wavenumber range that defines the half width of first excitation light 15 does not necessarily need to overlap the wavenumber range that defines the half width of second excitation light 16.

[First Selective Optical System]

First selective optical system 30 is an optical system whose transmittance varies according to the wavelength of light. First selective optical system 30 filters first measurement light 25 and second measurement light 26 to be incident on spectroscopy measurer 20. First selective optical system 30 attenuates, for example, Rayleigh scattered light included in each of first measurement light 25 and second measurement light 26.

Figure 5:
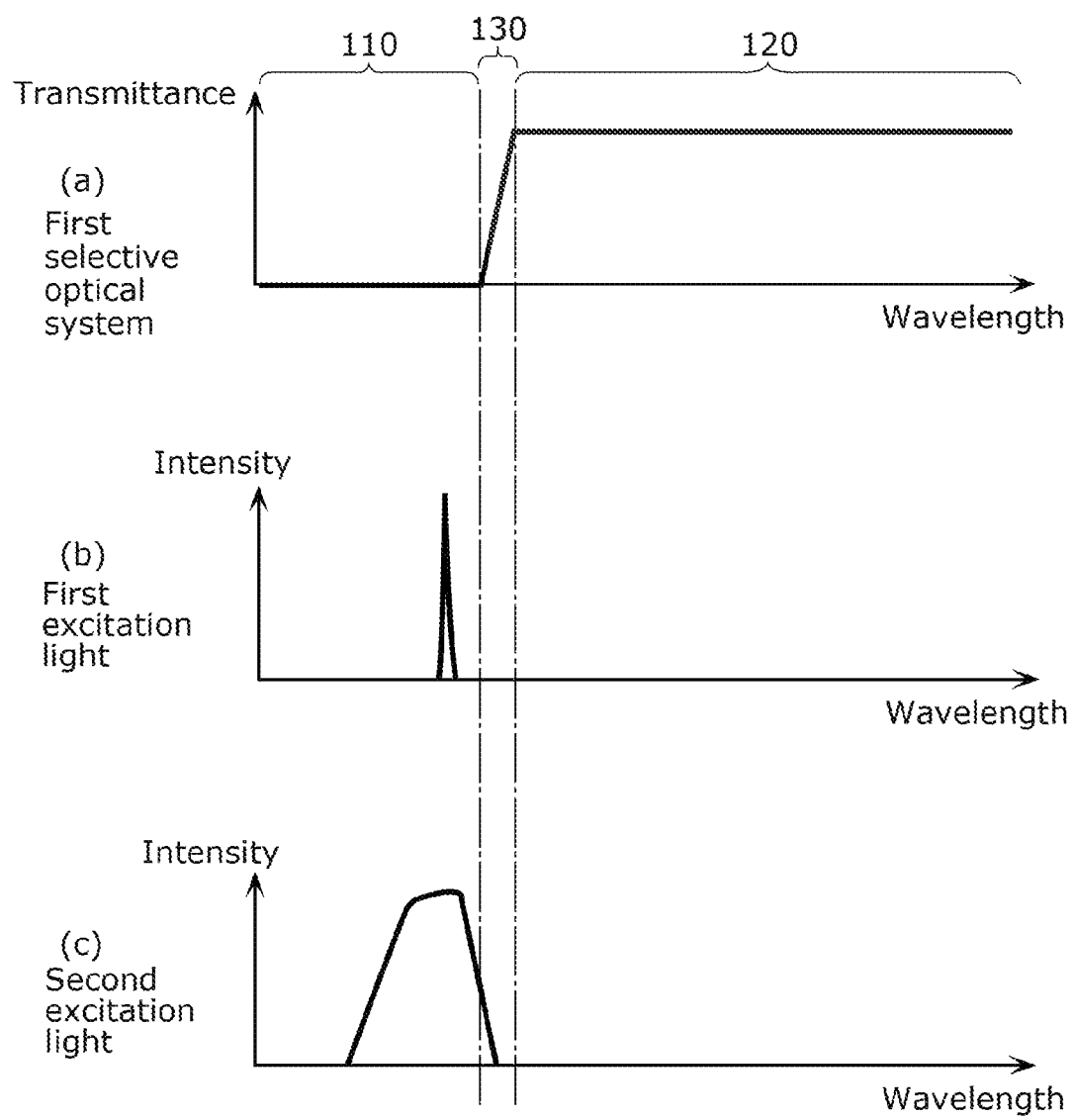
FIG. 5 is a diagram showing a relationship between (i) a transmission spectrum of a first selective optical system and (ii) spectrums of first excitation light and second excitation light according to the embodiment.

FIG. 5 is a diagram showing an example of a relationship between (i) a transmission spectrum of first selective optical system 30 and (ii) spectrums of first excitation light 15 and second excitation light 16. (a) in FIG. 5 shows an example of a transmission spectrum of first selective optical system 30. (b) in FIG. 5 shows an example of a spectrum of first excitation light 15. (c) in FIG. 5 shows an example of a spectrum of second excitation light 16.

As shown in (a) in FIG. 5, first selective optical system 30 has stop band 110 that is an example of a first stop band and transmission band 120 that is an example of a first transmission band. The average transmittance of transmission band 120 is higher than the average transmittance of stop band 110. The average transmittance of transmission band 120 is, for example, 10,000 times or more higher than the average transmittance of stop band 110.

The transmittance of stop band 110 of first selective optical system 30 is, for example, 0.01% or less, and may be 0.0001% or less. Also, the transmittance of transmission band 120 of first selective optical system 30 is, for example, 80% or more, and may be 90% or more.

The wavelength range of stop band 110 includes a wavelength range in which first excitation light 15 and second excitation light 16 have their main components. The wavelength range of stop band 110 does not necessarily need to include a wavelength range in which first excitation light 15 and second excitation light 16 substantially have no components. For example, in the case where first excitation light 15 and second excitation light 16 are in the visible light range, first selective optical system 30 may transmit or block the light in the ultraviolet region. That is, stop band 110 may or may not include a wavelength range in the ultraviolet region.

The wavelength range of transmission band 120 includes a wavelength range of a component the user of Raman spectroscopy device 100 intends to measure (for example, a Raman scattering peak the user wants to measure) in Raman scattered light of the sample induced by first excitation light 15. For example, in principle, Raman scattering may occur in a range up to the infrared range. However, in a range in which spectroscopy measurer 20 is insensitive, the transmittance of first selective optical system 30 does not affect measurement results. For this reason, transmission band 120 may transmit or block the light of a wavelength in a wavelength range in the infrared range. That is, transmission band 120 may or may not include the wavelength range in the infrared range. Also, the wavelength range that can be measured by spectroscopy measurer 20 at a time is limited by the number of grooves in the diffraction grating, the size of the detector array, and the like. Accordingly, in a wavelength range that is set such that spectroscopy measurer 20 cannot measure, the transmittance of first selective optical system 30 may be high or low.

First selective optical system 30 has at least one transmission band 120 on the long wavelength side relative to stop band 110. Also, transmission band 120 is located, for example, on the long wavelength side relative to both the center wavelength of first excitation light 15 and the center wavelength of second excitation light 16. Although not shown in the drawing, first selective optical system 30 may have another transmission band on the short wavelength side of stop band 110. Also, as shown in (a) in FIG. 5, first selective optical system 30 may have transition band 130 between stop band 110 and transmission band 120, transition band 130 having a transmittance intermediate between that of stop band 110 and that of transmission band 120.

Here, the relationship between stop band 110 and transmission band 120 of first selective optical system 30, the wavelength of first excitation light 15, and the wavelength of second excitation light 16 will be described with reference to FIG. 5.

As shown in (a) and (b) in FIG. 5, first excitation light 15 has a main component in stop band 110. As used herein, the expression "first excitation light 15 has a main component in stop band 110" means that one half or more of all components of first excitation light 15 in terms of intensity are included in stop band 110 of first selective optical system 30, and 90% or more of all components of first excitation light 15 in terms of intensity may be included in stop band 110 of first selective optical system 30.

First excitation light 15 substantially has no component in transmission band 120 of first selective optical system 30. As used herein, the expression "first excitation light 15 has no component in transmission band 120" means that components included in transmission band 120 of first selective optical system 30 have an intensity lower than the intensity of the Raman light scattering spectrum the user intends to measure. The intensity can vary depending on the sample. However, for example, the proportion of components that belong to transmission band 120 of first selective optical system 30 out of all components of first excitation light 15 is 0.01% or less, and may be 0.0001% or less.

As shown in (a) and (c) in FIG. 5, second excitation light 16 has a main component in stop band 110. As used herein, the expression "second excitation light 16 has a main component in stop band 110" means that one half or more of all components of second excitation light 16 in terms of intensity are included in stop band 110 of first selective optical system 30, and 90% or more of all components of second excitation light 16 in terms of intensity may be included in stop band 110 of first selective optical system 30.

Second excitation light 16 substantially has no component in transmission band 120 of first selective optical system 30. As used herein, the expression "second excitation light 16 has no component in transmission band 120" means that components included in transmission band 120 of first selective optical system 30 have an intensity lower than the intensity of the Raman light scattering spectrum the user intends to measure. The intensity can vary depending on the sample. However, for example, the proportion of components that belong to transmission band 120 of first selective optical system 30 out of all components of second excitation light 16 is 0.01% or less, and may be 0.0001% or less.

First selective optical system 30 is arranged such that first measurement light 25 and second measurement light 26 emitted from the sample are incident on first selective optical system 30 before first measurement light 25 and second measurement light 26 are incident on spectroscopy measurer 20 by measurement optical system 70. In the example shown in FIG. 1, first selective optical system 30 is arranged on an optical path of first measurement light 25 and second measurement light 26, specifically, the optical path of first measurement light 25 and second measurement light 26 between the sample and spectroscopy measurer 20.

First selective optical system 30 is configured by using, for example, a long pass filter or a band pass filter composed of a dielectric multilayer film, a dichroic mirror, a monochromator that includes a diffraction grating or a spectral prism, or the like. Also, first selective optical system 30 may be configured unitarily with spectroscopy measurer 20, and a front-stage spectroscope portion of a triple monochromator or a double monochromator may function as first selective optical system 30.

As described above, the wavelength ranges of stop band 110 and transmission band 120 of first selective optical system 30 are associated with, for example, the wavelengths of first excitation light 15 and second excitation light 16. For this reason, in the case where irradiator 10 includes a mechanism that changes the center wavelength of first excitation light 15, first selective optical system 30 may function to change the ranges of stop band 110 and transmission band 120 in response to a change in the center wavelength of first excitation light 15. That is, first selective optical system 30 is capable of changing the range of stop band 110 and the range of transmission band 120, and may change the range of stop band 110 and the range of transmission band 12 according to a change in the wavelength of first excitation light 15.

This function of first selective optical system 30 may be implemented by, for example, configuring first selective optical system 30 to include a plurality of filters and a filter wheel that switches the plurality of filters. In the case where first light source 11 includes a plurality of light sources of different wavelengths, for example, stop band 110 and transmission band 120 of each of the plurality of filters are set such that the plurality of filters form pairs with the plurality of light sources to have the relationship between the wavelength of first excitation light 15, the range of stop band 110, and the range of transmission band 120 described above.

Also, this function of first selective optical system 30 may be implemented by configuring first selective optical system 30 to include a mechanism that adjusts the angle or slit width of the diffraction grating or the spectral prism included in the monochromator. Also, this function of first selective optical system 30 may be implemented by, for example, configuring first selective optical system 30 to include a linear variable long pass filter that is designed such that the transmission properties are changed according to the position on which first measurement light 25 and second measurement light 26 are incident, and a mechanism that adjusts the position of the linear variable long pass filter.

[Optical System]

As shown in FIG. 1, optical system 50 guides excitation light for Raman spectroscopy measurement to the sample, and also guides measurement light emitted from the sample when the sample is irradiated with the excitation light to spectroscopy measurer 20. Optical system 50 includes, for example, excitation optical system 60 and measurement optical system 70 that share some structural elements. The configuration of optical system 50 described below is merely an example, and thus is not limited to the configuration described below. The structural elements of optical system 50 may be configured according to the positional relationship between irradiator 10, spectroscopy measurer 20, and the sample, or the like.

Excitation optical system 60 functions to irradiate the sample with first excitation light 15 and second excitation light 16. Excitation optical system 60 includes, for example, mirror 61, movable mirror 62, and semi-transparent mirror 63 for controlling optical paths, and also includes microscope objective lens 64. Semi-transparent mirror 63 is, for example, a dichroic mirror, a polarization beam splitter, or the like.

Excitation optical system 60 may further include: a light condensing device for irradiating the sample with light in a desired area, the condensing device including a lens, a curved mirror, and the like; a diaphragm for limiting the irradiation range; and the like. Also, excitation optical system 60 may include an optical fiber, a lens, and the like.

Also, excitation optical system 60 includes, for example, a switching mechanism that switches the light to be applied to the sample between first excitation light 15 and second excitation light 16. The switching mechanism can be configured by using, for example, movable mirror 62 that is arranged on the optical paths of first excitation light 15 and second excitation light 16. As shown in FIG. 1, first excitation light 15 is guided to the sample by, for example, being reflected by mirror 61, movable mirror 62, and semi-transparent mirror 63 in this order to change the optical axis. When guiding second excitation light 16 to the sample, movable mirror 62 moves from the position shown in FIG. 1 to a position on which second excitation light 16 is not incident, and second excitation light 16 is guided to the sample by, for example, being reflected by semi-transparent mirror 63 to change the optical axis. With this configuration, it is possible to switch the light to be applied to the sample between first excitation light 15 and second excitation light 16.

Also, excitation optical system 60 may include an optical path merging mechanism that merges the optical path of first excitation light 15 and the optical path of second excitation light 16 with the optical path extending toward the sample. The optical path merging mechanism can be configured by using, for example, a beam splitter. In the case where excitation optical system 60 includes the optical path merging mechanism, a shutter may be provided in each of the optical path of first excitation light 15 and the optical path of second excitation light 16 before merging such that only either one of first excitation light 15 or second excitation light 16 can be applied to the sample. Also, irradiator 10 may function to stop light emission of first light source 11 and second light source 12 by using a current limiting circuit or the like, and may perform switching between light emission of first excitation light 15 and light emission of second excitation light 16.

In the case where excitation optical system 60 is configured by using an optical fiber, a lens, and the like, a connecting portion that connects irradiator 10 and an optical fiber on which first excitation light 15 is to be incident and a connecting portion that connects irradiator 10 and an optical fiber on which second excitation light 16 is to be incident may be configured by using connectors, and switching between light emission of first excitation light 15 and light emission of second excitation light 16 may be performed by changing the connector. A configuration is also possible in which a branched optical fiber is used to merge first excitation light 15 and second excitation light 16.

Excitation optical system 60 does not necessarily need to partially match the optical path of first excitation light 15 and the optical path of second excitation light 16. Excitation optical system 60 may be configured to emit, for example, first excitation light 15 and second excitation light 16 to the sample via completely different optical paths.

Measurement optical system 70 functions to condense first measurement light 25 and second measurement light 26 that are emitted from the sample and include scattered light such as Raman scattered light and fluorescent light, and cause the condensed light to be incident on spectroscopy measurer 20.

Measurement optical system 70 may share, for example, some structural elements with excitation optical system 60. For example, microscope objective lens 64 that condenses first excitation light 15 and second excitation light 16 at a specific position of the sample also functions as a microscope objective lens that condenses first measurement light 25 and second measurement light 26 that are emitted from the specific position of the sample.

Also, measurement optical system 70 may further include: for example, light condensing optical components such as a lens and a curved mirror for condensing first measurement light 25 and second measurement light 26 emitted from the sample; imaging optical components such as a lens and a curved mirror for causing light to be incident on the light incident portion of spectroscopy measurer 20 in an appropriate beam shape; a confocal optical system for limiting the measurement range; and the like.

Also, measurement optical system 70 may include a mechanism for checking the sample and an irradiated portion of the sample irradiated with first excitation light 15 and second excitation light 16. This mechanism can be configured by using, for example, a camera, a lighting device, and the like. As the lighting device for observing the sample, it is appropriate to use a lighting device that has a broad wavelength range, and the lighting device may be configured by using, for example, a light source such as a white LED or a halogen lamp. These light sources may have components in transmission band 120 of first selective optical system 30.

[Spectroscopy Measurer]

Spectroscopy measurer 20 functions to measure spectrums of first measurement light 25 and second measurement light 26 emitted from the sample. Spectroscopy measurer 20 may include: for example, a monochromator or a spectrometer that includes a distributing optical element that changes optical paths according to light wavelength such as a diffraction grating or a spectral prism; and a detector, such as a photodiode, a CCD (Charge Coupled Device), an InGaAs (Indium Gallium Arsenide) array detector, or a photomultiplier tube, that outputs an electric signal according to the intensity of incident light.

The detector may sequentially output signals according to the incident light intensity. Alternatively, the detector may accumulate electric signals generated by incidence of light within the measurement time and thereafter output a total amount of charge.

Also, spectroscopy measurer 20 may include an interferometer. Interferometer is a device that changes transmittance at each wavelength by utilizing a light interference phenomenon. For example, in an interferometer that includes a mirror, when the position of the mirror is dynamically changed, transmittance at each wavelength varies according to the position of the mirror. By utilizing this property, spectroscopy measurer 20 can perform spectroscopy measurement by measuring an output from the interferometer using a detector while changing the position of the mirror. Also, spectroscopy measurer 20 can also perform spectroscopy measurement collectively by causing first measurement light 25 and second measurement light 26 from the sample to be simultaneously incident on a plurality of interferometers of different optical path length differences, and measuring outputs from the interferometers by using a detector.

Spectroscopy measurer 20 outputs, for example, a spectroscopy measurement result including detection results obtained by the detectors detecting first measurement light 25 and second measurement light 26 to measurement processor 90.

[Other Structural Elements]

As described above, Raman spectroscopy device 100 includes, for example, measurement processor 90 and storage 95.

Measurement processor 90 is a processing device that analyzes the spectroscopy measurement result of spectroscopy measurer 20, and the like. Measurement processor 90 acquires a spectroscopy measurement result from spectroscopy measurer 20. Measurement processor 90 analyzes, for example, the acquired spectroscopy measurement result. Also, measurement processor 90 performs processing of controlling operations of irradiator 10, spectroscopy measurer 20, and optical system 50 so as to perform Raman spectroscopy measurement. Measurement processor 90 outputs control signals for controlling the operations of irradiator 10, spectroscopy measurer 20, and optical system 50 to irradiator 10, spectroscopy measurer 20, and optical system 50. Irradiator 10, spectroscopy measurer 20, and optical system 50 operate based on the control signals. Measurement processor 90 controls, for example, the wavelength of first excitation light 15, the wavelength of second excitation light 16, the second line width of second excitation light 16, the ranges of stop band 110 and transmission band 120 of first selective optical system 30, and the like based on the spectroscopy measurement result obtained by spectroscopy measurer 20.

Measurement processor 90 is implemented by using, for example, a microcontroller that includes one or more processors storing programs. The functions of measurement processor 90 may be implemented by using a combination of a general-purpose processing circuit and software, or may be implemented by using hardware specialized for processing of measurement processor 90.

Measurement processor 90 records, for example, a measurement result obtained as a result of spectroscopy measurement performed on first measurement light 25 and a measurement result obtained as a result of spectroscopy measurement performed on second measurement light 26 in storage 95. Also, measurement processor 90 performs, for example, computation such as calculating a differential spectrum based on the measurement result obtained as a result of spectroscopy measurement performed on first measurement light 25 and the measurement result obtained as a result of spectroscopy measurement performed on second measurement light 26. Details of processing of spectroscopy measurement results performed by measurement processor 90 will be described later.

Also, measurement processor 90 may automatically perform switching between measurement using first excitation light 15 and measurement using second excitation light 16 by controlling irradiator 10 and optical system 50. Also, measurement processor 90 may perform the measurement using second excitation light 16 after performing the measurement using first excitation light 15 by controlling the operations of irradiator 10 and optical system 50.

Also, measurement processor 90 may change the wavelength of second excitation light 16 in response to the wavelength of first excitation light 15 being changed, by controlling irradiator 10 and optical system 50.

Storage 95 is a storage device in which measurement results obtained by spectroscopy measurer 20 are stored. In storage 95, information indicating a wavelength range in which the fluorescent light spectrum of the sample exhibits less excitation light wavelength dependence may be stored. In storage 95, for example, a sample information table is stored, the sample information table being an information table in which the type of sample is associated with range 701 of the sample, which will be described later. The sample information table may be an information table in which the type of sample is associated with the wavelength of first excitation light and the wavelength of second excitation light used to perform Raman spectroscopy measurement on the sample.

Storage 95 is implemented by using, for example, a semiconductor memory or the like.

[Principle]

Next, a principle for solving the first problem and the second problem described above by using Raman spectroscopy device 100 according to the present embodiment will be described.

First, a description will be given of findings found by the inventors of the present application as a result of performing studies on the reason that a fluorescent light spectrum has excitation light wavelength dependence, which is the second problem.

Figure 6:
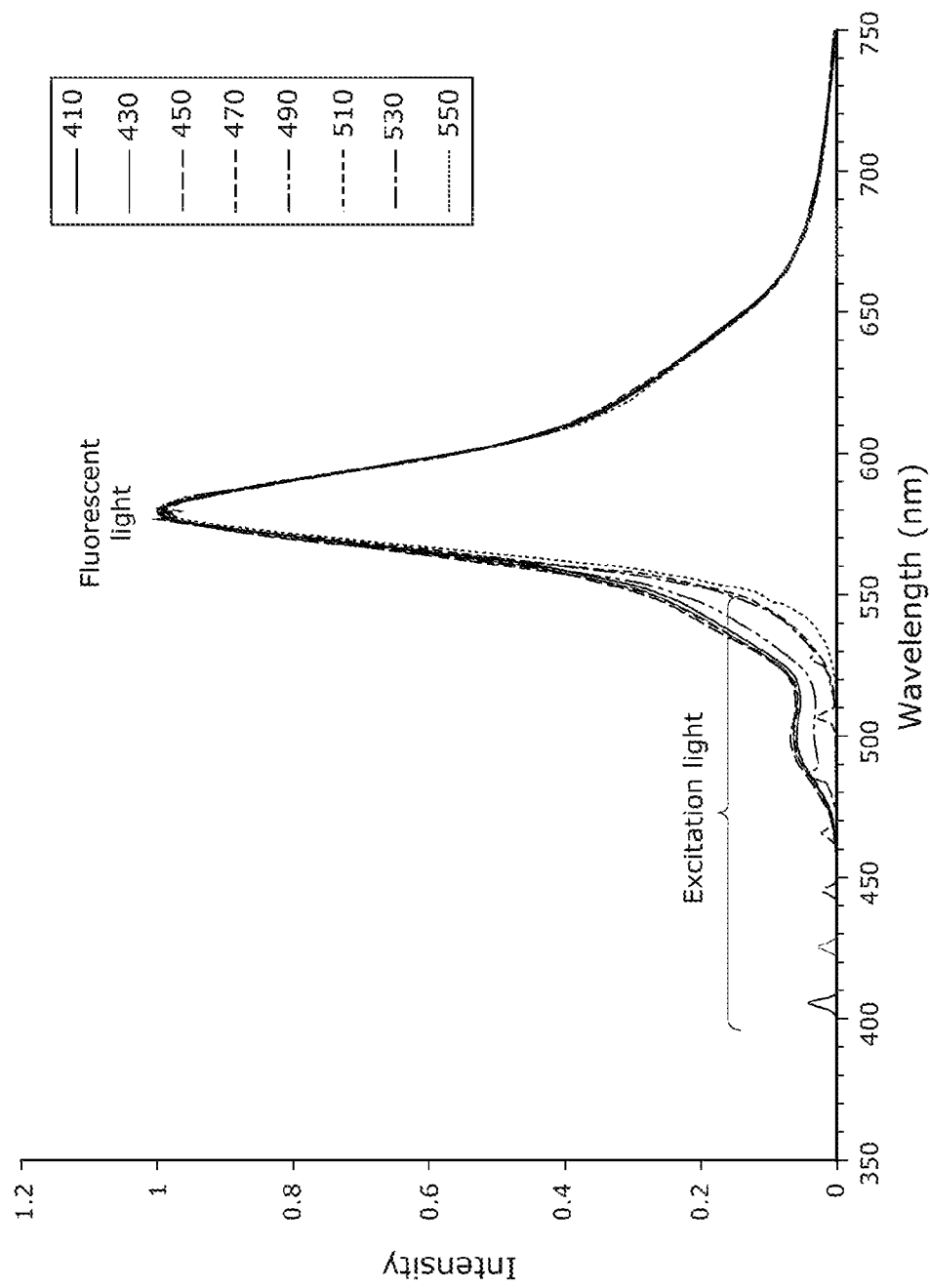
FIG. 6 is a diagram illustrating excitation light wavelength dependence of a fluorescent light spectrum.

FIG. 6 is a diagram illustrating the excitation light wavelength dependence of a fluorescent light spectrum. The fluorescent light spectrum shown in FIG. 6 is a fluorescent light spectrum obtained through excitation with excitation light of different wavelengths every 20 nm in a range of about 410 nm to about 550 nm by using fluorescent light microscope slides FSK5 available from Thorlabs, Inc. The numerical value in the explanatory example shown in FIG. 6 indicates the wavelength (nm) of the excitation light. In FIG. 6, components that have peaks at around 500 nm and around 600 nm and are distributed over a range of about 480 nm to over 700 nm are fluorescent light components. On the other hand, small peaks located in a range of around 410 nm to around 550 nm are peaks derived from the excitation light.

As shown in FIG. 6, when the wavelength of the excitation light is about 470 nm or less, the fluorescent light spectrums substantially match, whereas when the wavelength of the excitation light is about 490 nm or more, the fluorescent light spectrums vary depending on the wavelength. In particular, in the fluorescent light spectrums when the wavelength of the excitation light is about 490 nm or more, significant differences are observed for, in particular, the components on the short wavelength side relative to the peak wavelength close to about 600 nm. A similar phenomenon was also observed when a different phosphor was used.

The phenomenon described above can be interpreted as follows.

Figure 7:
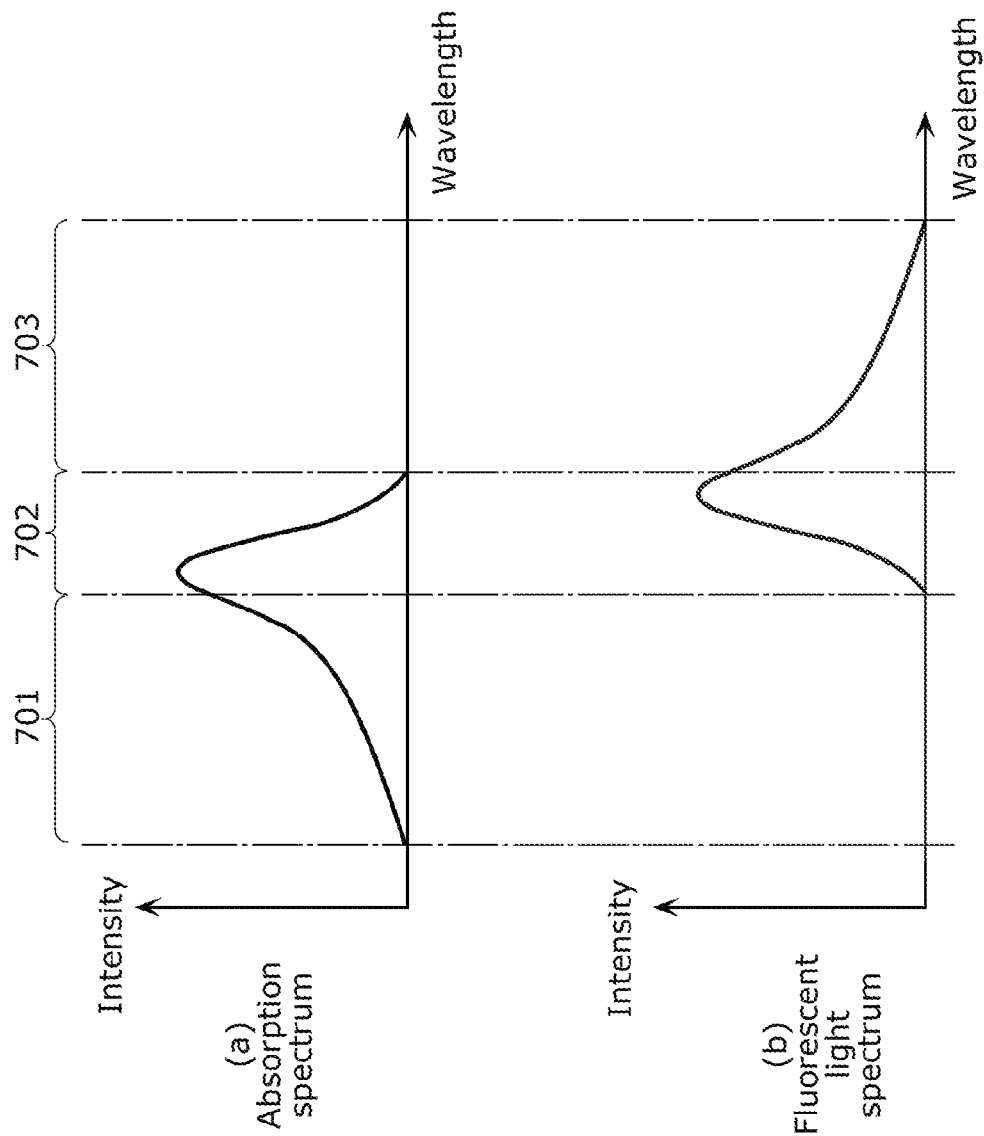
FIG. 7 is a schematic diagram showing an ordinary relationship between an absorption spectrum and a fluorescent light spectrum.

FIG. 7 is a schematic diagram showing an ordinary relationship between an absorption spectrum and a fluorescent light spectrum. (a) in FIG. 7 shows an absorption spectrum of a substance that emits fluorescent light, and (b) in FIG. 7 shows a fluorescent light spectrum of the substance. In the case of the substance that emits fluorescent light, in general, as shown in FIG. 7, the absorption spectrum and the fluorescent light spectrum exhibit a symmetric relationship. The fluorescent light spectrum shown in (b) in FIG. 7 is a fluorescent light spectrum obtained by exciting the substance with excitation light in a wavelength range of range 701, which will be described later.

As shown in FIG. 7, the absorption spectrum is located on the short wavelength side relative to the fluorescent light spectrum, and slightly overlaps the fluorescent light spectrum. That is, the substance that emits fluorescent light has the following three bands in the spectrums: range 701 that is a wavelength range that indicates absorption but in which fluorescent light has no component; range 702 that is a wavelength range that indicates absorption and in which fluorescent light has components; and range 703 that is a wavelength range that does not indicate absorption but in which fluorescent light has components.

Figure 8:
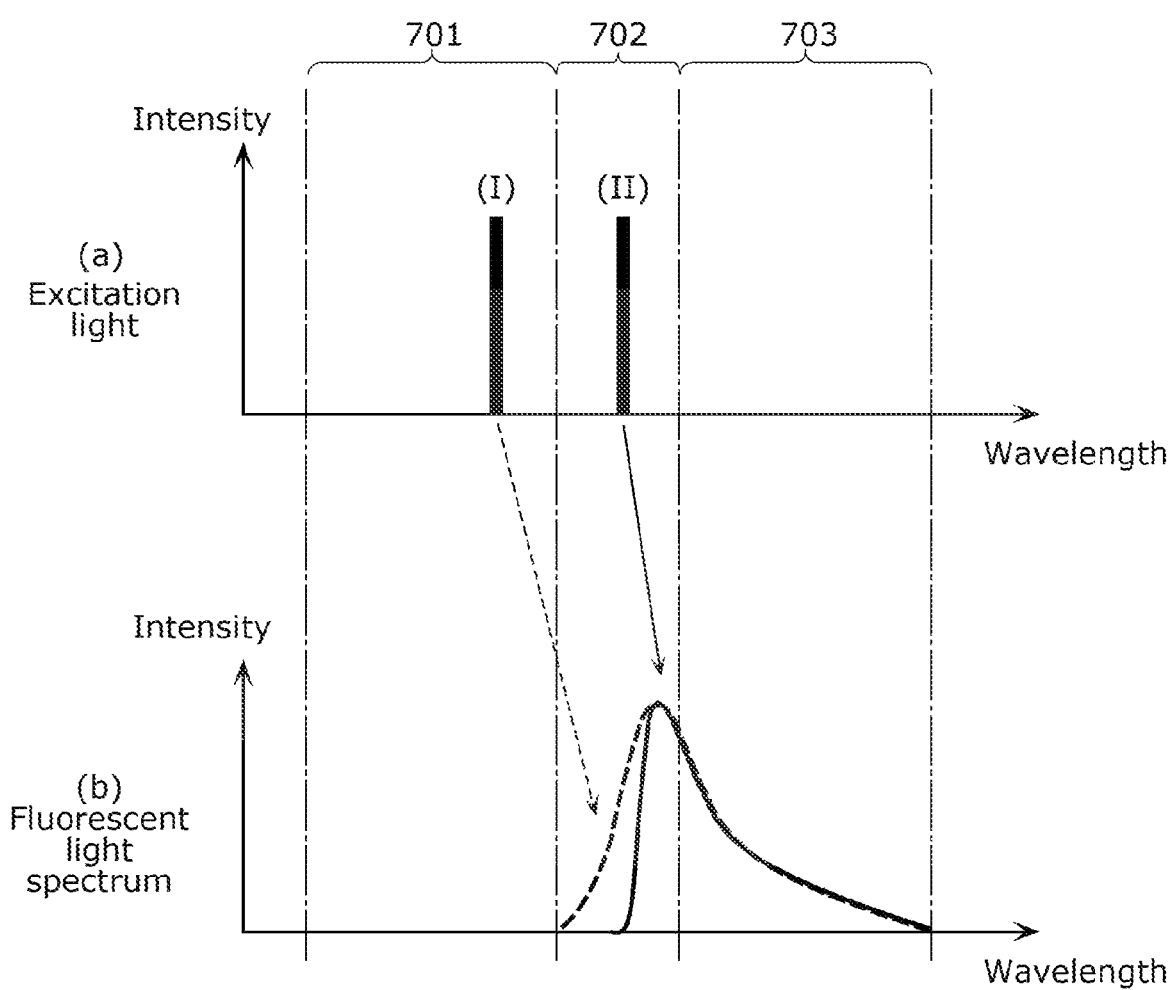
FIG. 8 is a schematic diagram showing a relationship between the wavelength of excitation light and fluorescent light spectrums.

Here, the fluorescent light spectrum of the substance that emits fluorescent light is different between the case where the substance is excited with excitation light of a wavelength included within range 701 and the case where the substance is excited with excitation light included within range 702. FIG. 8 is a schematic diagram showing a relationship between the wavelength of excitation light and fluorescent light spectrums. (a) in FIG. 8 shows the wavelength of excitation light, and (b) in FIG. 8 shows fluorescent light spectrums obtained by exciting the substance with excitation light shown in (a) in FIG. 8.

In the case where the substance is excited with excitation light of a wavelength included within range 701, due to an internal relaxation process, the substance relaxes to substantially the same state irrespective of the wavelength of the excitation light, and thereafter emits fluorescent light. For this reason, the fluorescent light spectrum depends less on the wavelength of the excitation light. For example, in the case where the substance is excited with excitation light (I) shown in (a) in FIG. 8, the emitted fluorescent light shows a fluorescent light spectrum as indicated by a broken line in (b) in FIG. 8. The fluorescent light spectrum does not vary as long as the wavelength of excitation light (I) is changed within range 701. The case where the substance is excited with excitation light of a wavelength included within range 701 described above corresponds to the case where the substance is excited with excitation light in a range of about 400 nm to about 470 nm as shown in FIG. 6.

On the other hand, in the case where the substance is excited with excitation light of a wavelength included within range 702, due to an energy conservation law, fluorescent light that has a wavelength shorter than the wavelength of the excitation light is not generated exceeding the range of fluctuation due to heat. For this reason, for example, in the case where the substance is excited with excitation light (II) shown in (a) in FIG. 8, the emitted fluorescent light indicates a fluorescent light spectrum as indicated by a solid line in (b) in FIG. 8 in which the short wavelength side relative to the wavelength of excitation light (II) is attenuated. Accordingly, the attenuating wavelength in the fluorescent light spectrum varies according to the wavelength of excitation light (II) in range 702. As a result, in the case where the substance is excited with excitation light of a wavelength included within range 702, the fluorescent light spectrum depends strongly on the wavelength of the excitation light. The case where the substance is excited with excitation light of a wavelength included within range 702 described above corresponds to the case where the substance is excited with excitation light in a range of about 490 nm to about 550 nm as shown in FIG. 6.

It can also be said that, in the case where a substance is excited with excitation light that has a broad line width such as second excitation light 16, the substance is excited with a plurality of excitation light beams of different wavelengths.

For this reason, by exciting the sample with excitation light in a wavelength range included within range 701, fluorescent light that shows substantially the same fluorescent light spectrum is emitted from the sample irrespective of the line width. Accordingly, in this case, it is possible to favorably obtain only a fluorescent light spectrum by subtracting an excitation spectrum derived from second excitation light 16 that has a broad line width from an excitation spectrum derived from first excitation light 15 that has a narrow line width. Also, second excitation light 16 that has a broad line width can be effectively utilized to sufficiently average Raman scattering.

Accordingly, by using first excitation light 15 in a wavelength range included within range 701 and second excitation light 16 in the method in which fluorescent light components are removed by calculating a difference between measurement results obtained by using two excitation light beams of different line widths, it is possible to obtain a spectrum from which fluorescent light has been most effectively removed.

The wavelength range that corresponds to range 701 varies depending on the sample. For this reason, as a result of Raman spectroscopy device 100 according to the present embodiment having the function of changing the wavelength of first excitation light 15 and the wavelength of second excitation light 16 according to range 701 of the sample, it is possible to obtain a spectrum from which fluorescent light has been more effectively removed.

Range 701 is located on the short wavelength side relative to range 702. For this reason, in the present embodiment, it is advantageous that the wavelength of first excitation light 15 and the wavelength of second excitation light 16 are in a short wavelength range, for example, the wavelength range from ultraviolet to green light.

On the other hand, in the case where the sample is excited with excitation light of a wavelength included within range 702, when the excitation light has a broad line width, it is equivalent to exciting the sample with a plurality of excitation light beams of significantly different wavelengths, and thus the fluorescent light spectrum exhibited by the sample varies according to the line width of the wavelength of the excitation light. For this reason, when the second line width of second excitation light 16 is too broad, the difference in fluorescent light spectrum with first excitation light 15 that has a narrow line width increases. Accordingly, even when a difference between measurement results obtained by using two excitation light beams of different line widths is calculated, it may not be possible to effectively remove fluorescent light spectrum.

Even in the case where the sample is excited with excitation light of a wavelength included within range 702, the state of the sample fluctuates due to heat. If the difference in energy caused by broadening the second line width of second excitation light 16 is limited to a level within the range of fluctuation due to heat, the difference in energy absorbed by first measurement light 25 and second measurement light 26 can be reduced, and relatively close fluorescent light spectrums can be obtained. That is, by setting the second line width of second excitation light 16 to be within the range of fluctuation due to heat, for example, to be 200 cm$^{-1}$ or less at room temperature, it is possible to obtain a fluorescent light spectrum that is relatively close to a fluorescent light spectrum obtained by exciting the sample with first excitation light 15. As a result, fluorescent light components can be effectively removed by the measurement result obtained as a result of spectroscopy measurement performed on first measurement light 25 and the measurement result obtained as a result of spectroscopy measurement performed on second measurement light 26.

The specific wavelength ranges of range 701 and range 702 are determined by fluorescent light substance contained in the sample. For this reason, when the fluorescent light substance contained in the sample is known or predicted, the specific wavelength ranges of range 701 and range 702 of the sample can be estimated before Raman spectroscopy measurement. Raman spectroscopy device 100 may be configured such that, for example, information indicating range 701 and range 702 of fluorescent light substances contained in samples that are known is stored in storage 95 or the like, and, in response to a person who performs measurement selecting the type of sample, the wavelength of first excitation light 15 and the wavelength of second excitation light 16 are determined to be within range 701, or the second line width is changed, automatically under control of measurement processor 90.

For example, in the case where the sample is a biological sample such as cells or a sample of biological origin, it is often the case that a fluorescent light substance called FAD (Flavin Adenine Dinucleotide) is contained in the sample. The absorption spectrum of FAD spreads over a range from the ultraviolet region to about 600 nm, and the fluorescent light spectrum of FAD spreads over a range from about 450 nm to about 700 nm. For this reason, in the case of FAD, range 701 extends from the ultraviolet region (for example, 200 nm) to about 450 nm, and range 702 extends from 450 nm to about 600 nm. From this, the center wavelength of first excitation light 15 may be 450 nm or less. Also, the center wavelength of second excitation light 16 may also be 450 nm or less.

For example, when a laser or the like that emits light that has a center wavelength of 405 nm is used as first light source 11, the center wavelength of first excitation light 15 is included within range 701. On the other hand, when a laser or the like that emits light that has a center wavelength of 488 nm or 532 nm is used as first light source 11, the center wavelength of first excitation light 15 is included within range 702.

As another example, fullerene C60 that is often used in organic semiconductor devices will be described. The absorption spectrum of fullerene C60 spreads over a range from the ultraviolet region to about 650 nm, and the fluorescent light spectrum of fullerene C60 spreads over a range from about 600 nm to about 900 nm. For this reason, in the case of fullerene C60, range 701 extends from the ultraviolet region (for example, 200 nm) to a wavelength of about 600 nm, and range 702 extends from a wavelength of about 600 nm to about 650 nm. From this, the center wavelength of first excitation light 15 may be 600 nm or less. Also, the center wavelength of second excitation light 16 may also be 600 nm or less.

For example, when a laser or the like that emits light that has a center wavelength of 405 nm, 488 nm, 514 nm, or 532 nm is used as first light source 11, the center wavelength of first excitation light 15 is included within range 701. On the other hand, when a laser or the like that emits light that has a center wavelength of 633 nm is used as first light source 11, the center wavelength of first excitation light 15 is included within range 702.

Next, a description will be given of a measurement condition for measuring a low-wavenumber Raman scattering peak, which is the first problem.

In order to observe Raman scattering with a certain wavenumber in the method for obtaining a differential spectrum based on results of measurement performed by using two excitation light beams of different line widths, a wavelength range in which excitation light that has a broad line width has a main component must not overlap a Raman scattering peak generated by excitation light that has a narrow line width.

In the present embodiment, second excitation light 16 that is excitation light that has a broad line width does not have a main component in transmission band 120 of first selective optical system 30, and thus almost no scattered light component with a high intensity such as Rayleigh scattered light in second measurement light 26 to be incident on spectroscopy measurer 20 is included in transmission band 120 that allows light in a wavelength range that includes the Raman scattering peak that needs to be measured to pass therethrough. For this reason, it is possible to acquire a spectrum of second measurement light 26 that includes no high intensity component derived from Rayleigh scattering caused by second excitation light 16 in transmission band 120 that includes a Raman scattering peak of scattered light emitted from the sample by first excitation light 15 that is excitation light that has a narrow line width. Accordingly, by subtracting a spectrum obtained by using second measurement light 26 from a spectrum obtained by using first measurement light 25, it is also possible to suppress a situation in which the Raman light scattering spectrum of first measurement light 25 disappears due to the influence of second excitation light 16. Accordingly, with Raman spectroscopy device 100, it is possible to effectively remove the influence of fluorescent light in Raman spectroscopy measurement.

Next, a description will be given of an observation condition for accurately observing a lower-wavenumber Raman scattering peak.

Raman scattered light can occur in both the short wavelength side (anti-stokes process) and the long wavelength side (stokes process) relative to the excitation light. In the spectrum to be measured, in principle, it is not possible to achieve a situation in which second excitation light 16 that has a broad line width does not overlap both anti-stokes process components and stokes process components caused by first excitation light 15 that has a narrow line width.

When the center wavelength of first excitation light 15 that has a narrow line width and the center wavelength of second excitation light 16 that has a broad line width are substantially matched with each other, an overlap between second excitation light 16 that has a broad line width and a Raman scattering peak caused by first excitation light 15 appears equally on the anti-stokes process side and the stokes process side.

However, as long as the stokes process is measured, it is possible to sufficiently obtain information such as the composition of the sample and the physical properties of the sample excluding some information such as the temperature of the sample. It is also possible to obtain an advantage in that the light emission intensity in the stokes process is higher than that in the anti-stokes process.

Accordingly, in a wavenumber space, as a result of first excitation light 15 being located on the low wavenumber side relative to the center of the wavenumber range that defines the half width of second excitation light 16, more overlaps between second excitation light 16 that has a broad line width and a Raman scattering peak caused by first excitation light 15 that has a narrow line width can be generated on the anti-stokes process side of Raman scattering caused by first excitation light 15 as compared with the case where the center wavelength of first excitation light 15 and the center wavelength of second excitation light 16 are substantially matched with each other. That is, even when second excitation light 16 that has the same line width is used, overlaps on the stokes process side of Raman scattering caused by first excitation light 15 can be reduced. As a result, in the method in which the influence of fluorescent light is removed by subtracting a spectrum obtained by using second measurement light 26 from a spectrum obtained by using first measurement light 25, lower-wavenumber Raman scattering can be accurately observed. For example, the wavelength range of transmission band 120 can be extended to the low wavelength side.

Also, in the wavenumber space, as a result of first excitation light 15 being located on the low wavenumber side relative to the center of the wavenumber range that defines the half width of second excitation light 16, more components of second excitation light 16 are located on the high wavenumber side, or in other words, on the low wavelength side relative to first excitation light 15. For this reason, the components of second excitation light 16 are likely to be included in range 701 described above, and the influence of variation in the fluorescent light spectrum caused by the line width being broadened is unlikely to occur.

Also, as described above, for example, in a wavenumber range that defines the half width, more components of second excitation light 16 are distributed the side where first excitation light 15 is located relative to the center of the wavenumber range that defines the half width of the second excitation light than on the side where first excitation light 15 is not located. This is effective to increase the similarity between the fluorescent light spectrum of fluorescent light excited by first excitation light 15 and the fluorescent light spectrum of fluorescent light excited by second excitation light 16. Accordingly, even when the main component of first excitation light 15 is in range 702, it is possible to obtain a fluorescent light spectrum of first measurement light 25 and a fluorescent light spectrum of second measurement light 26 that are relatively close to each other.

Example of Operation of Raman Spectroscopy Device

Figure 9:
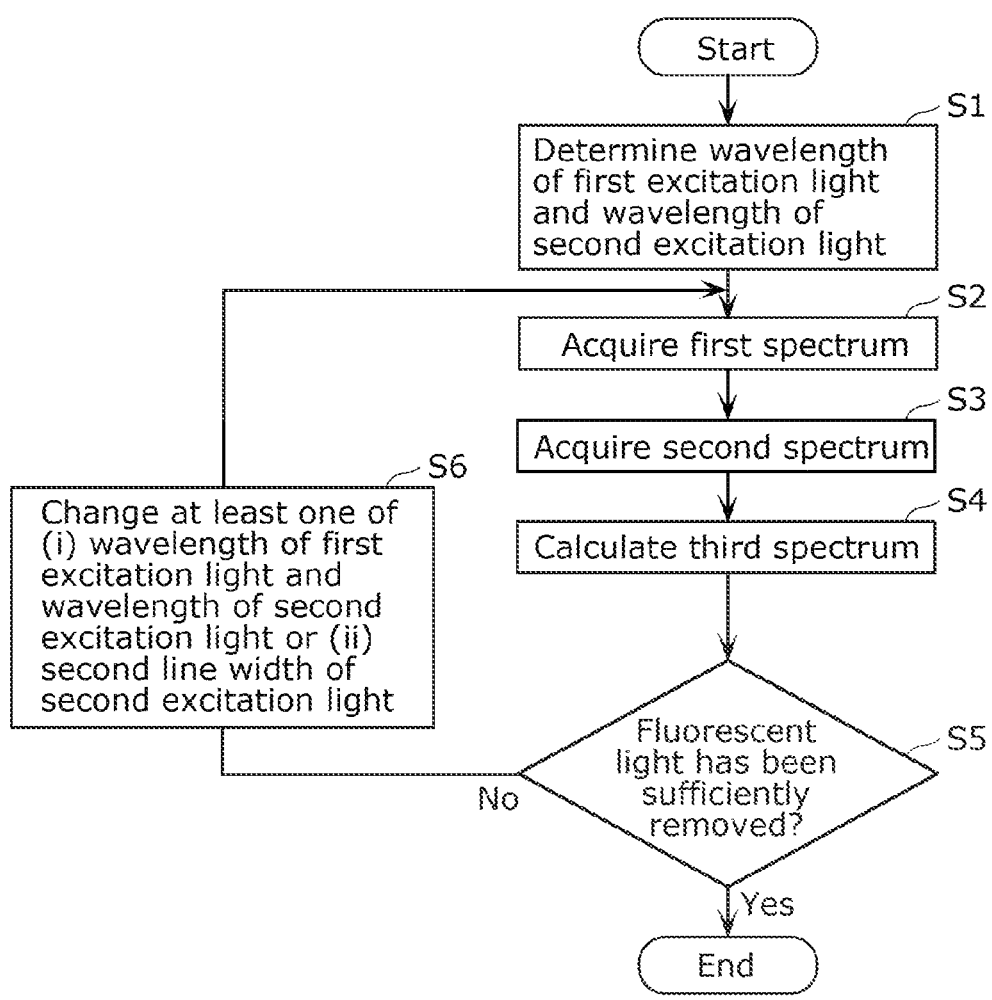
FIG. 9 is a flowchart illustrating an example of an operation performed by the Raman spectroscopy device according to the embodiment.

Next, an operation performed by Raman spectroscopy device 100 according to the present embodiment will be described. Specifically, a Raman spectroscopy measurement method performed by Raman spectroscopy device 100 will be described. FIG. 9 is a flowchart illustrating an example of an operation performed by Raman spectroscopy device 100 according to the present embodiment.

First, as an excitation light wavelength determining step, Raman spectroscopy device 100 acquires sample information regarding the sample, and determines the wavelength of first excitation light 15 and the wavelength of second excitation light 16 based on the acquired sample information (step S1). Raman spectroscopy device 100 performs the subsequent steps based on the determined results. For example, measurement processor 90 acquires the sample information as a result of an input receiver (not shown) composed of a keyboard, a touch panel, or the like receiving an input of the sample information from the user. Then, measurement processor 90 references the sample information table stored in storage 95, and determines the wavelength of first excitation light 15 and the wavelength of second excitation light 16 based on information associated with the acquired sample information. As the wavelength of first excitation light 15 and the wavelength of second excitation light 16, for example, the center wavelengths of first excitation light 15 and second excitation light 16 emitted from irradiator 10 may be used. In the case where the sample information table includes information indicating range 701 of the sample, measurement processor 90 determines the wavelength of first excitation light 15 and the wavelength of second excitation light 16 such that, for example, the main components of first excitation light 15 and second excitation light 16 are included in range 701.

In the case where an unknown sample is measured or the wavelength of first excitation light 15 and the wavelength of second excitation light 16 are fixed, step S1 may be omitted, and the subsequent steps may be performed by using predetermined wavelengths of first excitation light 15 and second excitation light 16.

Next, as a first acquiring step, Raman spectroscopy device 100 irradiates the sample with first excitation light 15, and acquires a first spectrum through spectroscopy measurement performed on first measurement light 25 emitted from the sample (step S2). In step S2, Raman spectroscopy device 100 irradiates the sample with first excitation light 15 that has the wavelength determined in step S1. For example, after the sample has been set in Raman spectroscopy device 100 by the user, irradiator 10 and optical system 50 emit first excitation light 15 to a desired measurement position of the sample based on a control signal from measurement processor 90. Then, measurement processor 90 acquires a spectroscopy measurement result of spectroscopy measurement performed on first measurement light 25 by spectroscopy measurer 20, and thereby acquires a first spectrum. Measurement processor 90 records the acquired first spectrum in, for example, storage 95. Irradiating the sample with first excitation light 15 may be performed automatically under control of measurement processor 90 or the like, or may be performed by the user operating Raman spectroscopy device 100.

Next, as a second acquiring step, Raman spectroscopy device 100 irradiates the sample with second excitation light 16, and acquires a second spectrum through spectroscopy measurement performed on second measurement light 26 emitted from the sample (step S3). In step S3, Raman spectroscopy device 100 irradiates the sample with second excitation light 16 that has the wavelength determined in step S1. For example, irradiator 10 and optical system 50 stop the irradiation of the sample with first excitation light 15 based on a control signal from measurement processor 90, then switch the excitation light optical path in optical system 50, and irradiate the sample with second excitation light 16. Then, measurement processor 90 acquires a spectroscopy measurement result of spectroscopy measurement performed on second measurement light 26 by spectroscopy measurer 20, and thereby acquires a second spectrum. Stopping irradiation of the sample with first excitation light 15 and irradiating the sample with second excitation light 16 may be performed automatically under control of measurement processor 90 or the like, or may be performed by the user operating Raman spectroscopy device 100.

Next, as a calculating step, Raman spectroscopy device 100 calculates a third spectrum that is a difference between one of the first spectrum or the second spectrum multiplied by a predetermined coefficient and an other of the first spectrum or the second spectrum (step S4). For example, measurement processor 90 calculates the third spectrum by subtracting the second spectrum from the first spectrum recorded in storage 95. Alternatively, measurement processor 90 may calculate the third spectrum by calculating the difference between one of the first spectrum or the second spectrum multiplied by a predetermined coefficient and an other of the first spectrum or the second spectrum such that the third spectrum includes a less number of components corresponding to fluorescent light. The predetermined coefficient is determined by, for example, the degree of generation of fluorescent light from the sample, or the like. In the case where the type of sample to be measured is determined in advance, a coefficient suitable for the sample is set. In the case where an unknown sample is measured, measurement processor 90 may repeatedly calculate a differential spectrum by changing the coefficient so as to obtain a plurality of differential spectrums, and acquire a differential spectrum that includes the least number of components corresponding to fluorescent light, as the third spectrum.

Measurement processor 90 records the acquired third spectrum in, for example, storage 95. Also, measurement processor 90 may output the acquired third spectrum to a display device, an external device, or the like (not shown).

Next, as a determining step, Raman spectroscopy device 100 determines, based on the third spectrum calculated in step S4, whether fluorescent light has been sufficiently removed (step S5). That is, Raman spectroscopy device 100 determines whether fluorescent light has been sufficiently removed from the third spectrum by calculating a difference between the first spectrum and the second spectrum. For example, measurement processor 90 determines whether fluorescent light has been sufficiently removed from the third spectrum based on whether spectrums other than Raman scattering peaks in the third spectrum, or in other words, a so-called base line is flat. For example, measurement processor 90 determines that fluorescent light components have been sufficiently removed if the base line has a flatness greater than or equal to a predetermined level. When the first spectrum and the second spectrum have high similarity in terms of the spectrum derived from fluorescent light, the base line has a high flatness. On the other hand, when the first spectrum and the second spectrum have low similarity in terms of the spectrum derived from fluorescent light, reflecting the low similarity, the base line has wavelength dependence, and thus the base line has a low flatness. For this reason, whether fluorescent light components have been sufficiently removed can be determined based on the flatness of the base line. The flatness of the base line can be determined by, for example, a slope between two points in the base line at a predetermined wavenumber, a difference between maximum and minimum values of the base line, or the like. Whether fluorescent light components have been sufficiently removed can be determined by using another algorithm and method. For example, measurement processor 90 may make the determination based on trained logical models by performing machine learning to construct the trained logical models in which fluorescent light has been sufficiently removed and in which fluorescent light is not sufficiently removed.

In the case where the second line width is narrow, due to insufficient averaging of Raman scattering peak, the Raman scattering peak remains in the second spectrum, which is also reflected to the third spectrum, and thus the third spectrum is distorted. For this reason, measurement processor 90 may determine whether sufficient averaging of Raman scattering peak due to second excitation light 16 has been performed, in addition to making the determination in step S5.

Also, Raman spectroscopy device 100 may end the processing of performing Raman spectroscopy measurement after step S4, without performing the operation of step S5.

If it is determined that fluorescent light has been sufficiently removed (Yes in step S5), Raman spectroscopy device 100 ends the processing of performing Raman spectroscopy measurement. Also, measurement processor 90 may output information indicating that Raman spectroscopy measurement has been finished successfully to the user as the result determined in step S5.

On the other hand, if it is determined that fluorescent light has not been sufficiently removed (No in step S5), Raman spectroscopy device 100 changes at least one of (i) the wavelength of first excitation light 15 and the wavelength of second excitation light 16 or (ii) the second line width of second excitation light 16 as a changing step (step S6). In step S6, measurement processor 90 changes, for example, the second line width to be a narrow line width. With this configuration, even when the main component of second excitation light 16 is included in range 702, the change in the fluorescent light spectrum caused by broadening the line width can be reduced. Also, when changing the second line width, measurement processor 90 changes the second line width to be a narrow line width, for example, such that the number of components on the low wavenumber side is reduced. Measurement processor 90 changes the second line width by, for example, changing the width of transmission band 220 of second selective optical system 40.

Also, in step S6, measurement processor 90 changes, for example, the wavelength of first excitation light 15 and the wavelength of second excitation light 16 to be shorter. With this configuration, the main components of first excitation light 15 and second excitation light 16 are likely to be included in range 701, and thus substantially the same fluorescent light spectrum can be easily obtained irrespective of the line width of excitation light. Measurement processor 90 changes the wavelength of first excitation light 15 by, for example, changing the center wavelength of light emitted by first light source 11. Also, measurement processor 90 changes the wavelength of second excitation light 16 by, for example, shifting the wavelength range of transmission band 220 of second selective optical system 40. Also, measurement processor 90 changes the wavelength of second excitation light 16 according to a change in the wavelength of first excitation light 15. Measurement processor 90 changes the wavelength of first excitation light 15 and the wavelength of second excitation light 16, for example, such that the amount of change when the center wavelength of light emitted by first light source 11 is changed is equal to the amount of change when the wavelength range of transmission band 220 of second selective optical system 40 is shifted.

Also, as described above, in the case where measurement processor 90 determines whether sufficient averaging of Raman scattering peak due to second excitation light 16 has been performed, if it is determined that sufficient averaging of Raman scattering peak due to second excitation light 16 has not been performed, measurement processor 90 changes the second line width to be a broad line width.

After step S6, Raman spectroscopy device 100 performs operation from step S2 by using first excitation light 15 and second excitation light 16 in which at least one of (i) the wavelength of first excitation light 15 and the wavelength of second excitation light 16 or (ii) the second line width of second excitation light 16 was changed in step S6.

Instead of performing step S6, measurement processor 90 may output the result determined in step S5, and Raman spectroscopy device 100 may end the processing. Measurement processor 90 outputs, as the determination result, for example, information that prompts the user to change at least one of (i) the wavelength of first excitation light 15 and the wavelength of second excitation light 16 or (ii) the second line width of second excitation light 16. The output determination result is displayed on, for example, a display device (not shown) or the like to inform the user of whether fluorescent light has been removed sufficiently, and prompt the user to take action.

OTHER EMBODIMENTS

The Raman spectroscopy device according to the present disclosure has been described above based on an embodiment, but the present disclosure is not limited to the embodiment given above.

For example, in the embodiment given above, the Raman spectroscopy device is implemented by using a single device, but may be implemented as a Raman spectroscopy system that includes a plurality of devices. In the case where the Raman spectroscopy device is implemented by using a plurality of devices, the structural elements included in the Raman spectroscopy device described in the embodiment given above may be assigned to the plurality of devices in any way.

Also, the Raman spectroscopy device does not necessarily need to include all structural elements described in the embodiment given above, and may be configured by using only structural elements required to perform intended operations.

Also, in the embodiment given above, a processing operation performed by a specific processor may be performed by a different processor. Also, the order of a plurality of processing operations may be changed. The plurality of processing operations may be performed in parallel.

Also, in the embodiment given above, the structural elements may be implemented by executing a software program suitable for the structural elements. The structural elements may be implemented by a program executor such as a CPU or a processor reading and executing the software program recorded in a recording medium such as a hard disk or a semiconductor memory.

Also, the structural elements may be implemented by using hardware. The structural elements may be circuits (or an integrated circuit). The circuits may constitute a single circuit as a whole, or may be separate circuits. Also, the circuits may be general-purpose circuits or dedicated circuits.

Also, generic or specific aspects of the present disclosure may be implemented by a system, a device, a method, an integrated circuit, a computer program or a computer readable recording medium such as a CD-ROM, or may be implemented by any combination of a system, a device, a method, an integrated circuit, a computer program and a recording medium.

For example, the present disclosure may be implemented as the Raman spectroscopy device of the embodiment given above, or as a program for causing a computer to execute the Raman spectroscopy measurement method performed by the processor, or as a computer-readable non-transitory recording medium in which the program is recorded.

Other embodiments obtained by making various modifications that can be conceived by a person having ordinary skill in the art to the embodiment and examples described above as well as other embodiments implemented by any combination of some of the structural elements of the embodiment and examples described above are also included in the scope of the present disclosure without departing from the gist of the present disclosure.

INDUSTRIAL APPLICABILITY

The Raman spectroscopy device according to the present disclosure is useful for Raman spectroscopy measurement on a substance that emits fluorescent light. In particular, the Raman spectroscopy device according to the present disclosure is applicable to Raman spectroscopy measurement on samples that emit fluorescent light such as biological molecules, food, and industrially used organic molecules.

The invention claimed is:
1. A Raman spectroscopy device comprising:
an irradiator that irradiates a measurement target with first excitation light that has a first line width and second excitation light that has a second line width broader than the first line width;
a spectroscopy measurer that performs spectroscopy measurement on first measurement light and second measurement light that are incident on the spectroscopy measurer, the first measurement light being emitted from the measurement target when the measurement target is irradiated with the first excitation light, the second measurement light being emitted from the measurement target when the measurement target is irradiated with the second excitation light; and
a first selective optical system that has a first transmission band and a first stop band, and filters the first measure- ment light and the second measurement light that are incident on the spectroscopy measurer, wherein the first excitation light and the second excitation light each have a main component in the first stop band, and the second excitation light has substantially no component in the first transmission band.

2. The Raman spectroscopy device according to claim 1, wherein the irradiator includes:

a light source that emits light source light; and a second selective optical system that has a second transmission band and a second stop band, and filters the light source light, and the measurement target is irradiated with the light source light that has been filtered by the second selective optical system as the second excitation light.

3. The Raman spectroscopy device according to claim 1, wherein, in a wavenumber space, the first excitation light is located on a low wavenumber side relative to a center of a wavenumber range that defines a half width of the second excitation light.

4. The Raman spectroscopy device according to claim 1, wherein, in a wavenumber space, more components of the second excitation light are located on a side where the first excitation light is located relative to a center of a wavenumber range that defines a half width of the second excitation light than on a side where the first excitation light is not located.

5. The Raman spectroscopy device according to claim 1, wherein the first excitation light has a center wavelength of 600 nm or less.

6. The Raman spectroscopy device according to claim 1, wherein the second line width is 200 $cm^{-1}$ or less.

7. The Raman spectroscopy device according to claim 1, wherein the irradiator is capable of changing the second line width.

8. The Raman spectroscopy device according to claim 1, wherein the irradiator is capable of changing a wavelength of the first excitation light and a wavelength of the second excitation light, and changes the wavelength of the second excitation light according to a change in the wavelength of the first excitation light, and the first selective optical system is capable of changing a range of the first transmission band and a range of the first stop band, and changes the range of the first transmission band and the range of the first stop band according to a change in the wavelength of the first excitation light.

9. A Raman spectroscopy measurement method performed by the Raman spectroscopy device according to claim 1, the Raman spectroscopy measurement method comprising:

acquiring a first spectrum by performing spectroscopy measurement on the first measurement light;

acquiring a second spectrum by performing spectroscopy measurement on the second measurement light; and calculating a third spectrum that is a difference between one of the first spectrum or the second spectrum multiplied by a predetermined coefficient and an other of the first spectrum or the second spectrum.

10. The Raman spectroscopy measurement method according to claim 9, comprising determining, based on the third spectrum calculated, whether fluorescent light has been sufficiently removed.

11. The Raman spectroscopy measurement method according to claim 10, comprising: when it is determined in the determining that the fluorescent light has not been sufficiently removed, changing at least one of (i) the wavelength of the first excitation light and the wavelength of the second excitation light or (ii) the second line width, wherein, after the changing, the acquiring of the first spectrum, the acquiring of the second spectrum, and the calculating are performed again.

12. The Raman spectroscopy measurement method according to claim 9, comprising: determining the wavelength of the first excitation light and the wavelength of the second excitation light based on information indicating the measurement target, wherein the acquiring of the first spectrum, the acquiring of the second spectrum, and the calculating are performed based on a result determined in the determining of the wavelength of the first excitation light and the wavelength of the second excitation light.

* * * * *